(12) United States Patent
Nakade et al.

(10) Patent No.: US 11,812,163 B2
(45) Date of Patent: Nov. 7, 2023

(54) IMAGING DEVICE HAVING A MODULATOR THAT INCLUDES AT LEAST A FIRST GRATING PATTERN AND A SECOND GRATING PATERN HAVING A PHASE DEVIATING FROM A PHASE OF THE FIRST GRATING PATTERN

(71) Applicant: Maxell, Ltd., Kyoto (JP)

(72) Inventors: Mayumi Nakade, Kyoto (JP); Yusuke Nakamura, Tokyo (JP); Keisuke Inata, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 18/085,688

(22) Filed: Dec. 21, 2022

(65) Prior Publication Data

US 2023/0131626 A1    Apr. 27, 2023

Related U.S. Application Data

(63) Continuation of application No. 17/542,585, filed on Dec. 6, 2021, now Pat. No. 11,570,357, which is a continuation of application No. 17/266,163, filed as application No. PCT/JP2018/029800 on Aug. 8, 2018, now Pat. No. 11,228,705.

(51) Int. Cl.
*H04N 5/335*    (2011.01)
*H04N 23/80*    (2023.01)
*G02F 1/1343*    (2006.01)
*H04N 23/55*    (2023.01)

(52) U.S. Cl.
CPC ........... *H04N 23/80* (2023.01); *G02F 1/13439* (2013.01); *H04N 23/55* (2023.01); *G02F 2203/50* (2013.01)

(58) Field of Classification Search
CPC .................................................. G02F 1/13439
See application file for complete search history.

(56) References Cited

U.S. PATENT DOCUMENTS 10,649,118 B2 *  5/2020  Tajima et al. ......... H04N 23/815
10,911,643 B2 *  2/2021  Shimano ............... H04N 23/60
(Continued)

FOREIGN PATENT DOCUMENTS

JP    2016-63284 A    4/2016
WO   2017/149687 A1   9/2017
(Continued)

OTHER PUBLICATIONS

International Search Report of PCT/JP2018/029800 dated Oct. 30, 2018.

*Primary Examiner* — Gary C Vieaux
(74) *Attorney, Agent, or Firm* — MATTINGLY & MALUR, PC

(57) ABSTRACT

An imaging device includes a modulator, a first grating pattern constituted by a plurality of lines, and a second grating pattern having a phase deviating from a phase of the first grating pattern, and modulates light intensity. The imaging device receives a first image signal output by the first grating pattern and a second image signal output by the second grating pattern, calculates difference data and a range of a difference between the first image signal and the second image signal, generates and sets a data conversion parameter at a regular interval from the difference data that is continuously input on the basis of the range of the difference and the difference data, generates compression image data by using the difference data and the data conversion parameter, compresses the generated compression image data, and includes information indicating the range of the difference into the compressed data.

8 Claims, 33 Drawing Sheets

(56) References Cited

U.S. PATENT DOCUMENTS

| | | | |
|---|---|---|---|
| 10,951,793 B2* | 3/2021 | Nakamura et al. | .. H04N 23/672 |
| 11,228,705 B2* | 1/2022 | Nakade et al. | ......... H04N 19/85 |
| 11,570,357 B2* | 1/2023 | Nakade et al. | ........... G02B 7/36 |
| 2018/0095200 A1 | 4/2018 | Nakamura et al. | |
| 2018/0166489 A1 | 6/2018 | Sao et al. | |
| 2019/0339485 A1 | 11/2019 | Nakamura et al. | |
| 2019/0361257 A1 | 11/2019 | Shimano | |

FOREIGN PATENT DOCUMENTS

WO      2018/110120 A1    6/2018

* cited by examiner (a) $\Phi_F, \Phi=0$    (b) $\Phi_F, \Phi=\pi/2$    (c) $\Phi_F, \Phi=\pi$    (d) $\Phi_F, \Phi=3\pi/2$ FIG. 27
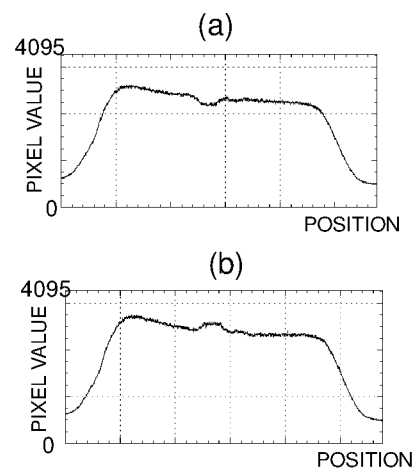
FIG. 28
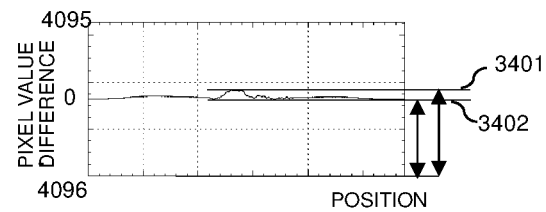
FIG. 29
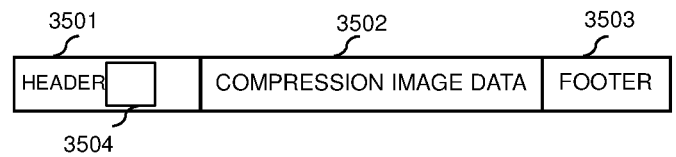
FIG. 30
| | ITEM | VALUE |
|---|---|---|
| 3601 | offset_l | 1960 |
| 3602 | offset_h | 2160 |

IMAGING DEVICE HAVING A MODULATOR THAT INCLUDES AT LEAST A FIRST GRATING PATTERN AND A SECOND GRATING PATERN HAVING A PHASE DEVIATING FROM A PHASE OF THE FIRST GRATING PATTERN

TECHNICAL FIELD

The present invention relates to an imaging device, an imaging system, and an imaging method.

BACKGROUND ART

As a so-called lensless imaging device, there is disclosed an imaging device that detects light rays from a subject as a spatial frequency of a moire fringe by a zone plate (FZP), and reconstructs an image of the subject from a Fourier transform image of the moire fringe. The lensless imaging device that does not use a lens is expected as an imaging device that realizes small size and low cost.

As a related art in this technical field, for example, Patent Document 1 is exemplified. Patent Document 1 discloses a method in which focus adjustment (refocusing), auto focus, and distance measurement are performed at the time of generating a moire fringe image from a sensor image captured by the lensless imaging device.

CITATION LIST

Patent Document

Patent Document 1: WO 2017/149687 A

SUMMARY OF THE INVENTION

Problems to Be Solved by the Invention

In Patent Document 1, it is necessary to record the sensor image so as to carry out the focus adjustment and the like after imaging. However, the sensor image in Patent Document 1 is a special image in which a subject is not clear, and the capacity of one image is large, and thus a large amount of storage capacity is necessary to store the image as is. Accordingly, it is desired to reduce the capacity of an image captured by the lensless imaging device.

Here, the invention has been made to solve the problem, and an object thereof is to provide an imaging device, an imaging system, and an imaging method which manage a moving image captured by a lensless imaging device in a state in which the capacity of the moving image is reduced.

Solutions to Problems

In consideration of the background art and the problem, according to an aspect of the invention, there is provided an imaging device that continuously captures images. The imaging device includes: an image sensor that converts optical images taken by a plurality of light reception elements arranged in an array shape on an imaging surface into image signals, and outputs the image signals; a modulator that is provided on a light reception surface of the image sensor and modulates light intensity; a signal processing unit that receives the image signals output from the image sensor; a difference processing unit that calculates a difference of the image signals received by the signal processing unit, and generates first difference data based on the difference; a parameter setting unit that sets a data conversion parameter on the basis of a range the difference of the image signals and the first difference data which are obtained by the difference processing unit; a data conversion unit that generates first compression image data by using the first difference data obtained by the difference processing unit, and the data conversion parameter obtained by the parameter setting unit; and a compression unit that compresses the first compression image data generated by the data conversion unit. The modulator includes a first grating pattern constituted by a plurality of lines, and a second grating pattern having a phase deviating from a phase of the first grating pattern. The signal processing unit receives a first image signal output by the first grating pattern, and a second image signal output by the second grating pattern. The difference processing unit calculates a difference between the first image signal and the second image signal. The parameter setting unit generates and sets the data conversion parameter from the first difference data, which is continuously input, at a regular interval. The compression unit includes information indicating a range of the difference into the compressed data.

Effects of the Invention

According to the invention, it is possible to provide an imaging device, an imaging system, and an imaging method which are capable of managing images captured by a lensless imaging device in a state in which the capacity of the images is reduced.

BRIEF DESCRIPTION OF THE DRAWINGS

FIG. 27 is a view showing an input pixel data example in inter-frame difference processing in the example of compressing the difference image data.

FIG. 28 is a view showing an output pixel data example in the inter-frame difference processing in the example of compressing the difference image data.

FIG. 29 is a view illustrating image information example that is added to a compressed file in the example of compressing the difference image data.

FIG. 30 is a view illustrating a format example of the compressed file in the example of compressing the difference image data.

MODE FOR CARRYING OUT THE INVENTION

Hereinafter, examples of the invention will be described with reference to the accompanying drawings.

Example 1

Patent Document 1 is incorporated with respect to the principle of a lensless imaging device that acquires an image of an external world without using an imaging lens which is a premise of the invention. Note that, a part of the principle will be described later, and refer to Patent Document 1 for details.

Figure 1:
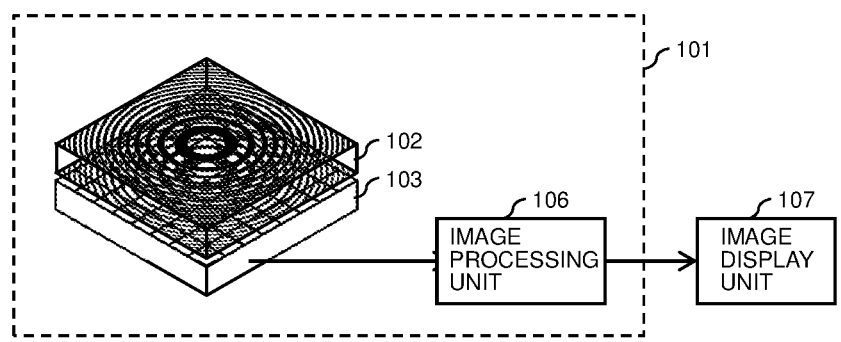
FIG. 1 is a basic configuration diagram of a lensless imaging device.

FIG. 1 is a basic configuration diagram of a lensless imaging device. As illustrated in FIG. 1, an imaging device 101 includes a modulator 102, an image sensor unit 103, and an image processing unit 106. An image signal output from the image sensor unit 103 is subjected to image processing by the image processing unit 106 that is an image processing unit, and is output to an image display unit 107 or the like.

Figure 2:
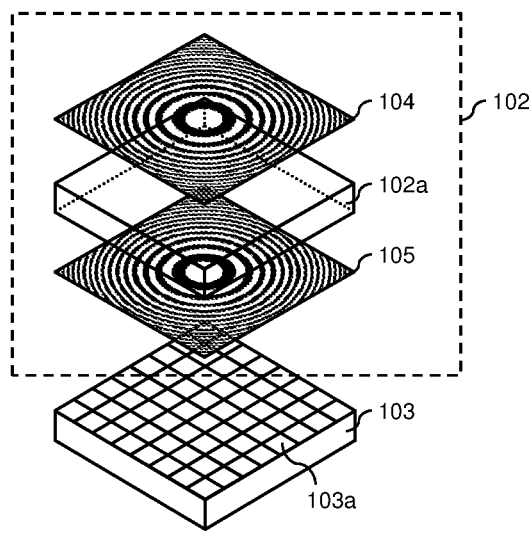
FIG. 2 is a configuration diagram illustrating an example of a modulator.

FIG. 2 is a configuration diagram illustrating an example of the modulator 102. In FIG. 2, the modulator 102 is fixed to a light reception surface of the image sensor unit 103, and a front surface side grating pattern 104 and a rear surface side grating pattern 105 are respectively formed on a front surface side and a rear surface side of a grating substrate 102a. In this manner, the modulator 102 is provided on the light reception surface of the image sensor unit 103. For example, the grating substrate 102a is formed from a transparent material such as glass and plastic.

Hereinafter, the image sensor unit 103 side of the grating substrate 102a is referred to as a rear surface, and an opposite surface, that is, an imaging target side is referred to as a front surface. The front surface side grating pattern 104 and the rear surface side grating pattern 105 are formed from grating patterns having a concentric circle shape in which an interval of grating patterns, that is, a pitch is narrowed in inversely proportional to a radius from the center as it goes toward an outer side.

Light intensity of light transmitted through the front surface side grating pattern 104 and the rear surface side grating pattern 105 is modulated by the grating patterns, and transmitted light is received by the image sensor unit 103.

Pixels 103a as a light reception element are regularly arranged on the front surface of the image sensor unit 103 in a grating shape (array shape). The image sensor unit 103 converts an optical image received by the pixels 103a into an image signal that is an electric signal. In this manner, the image sensor unit 103 converts the optical image taken by a plurality of the light reception elements arranged in an array shape on the imaging surface into an image signal and outputs image signal.

Figure 3:
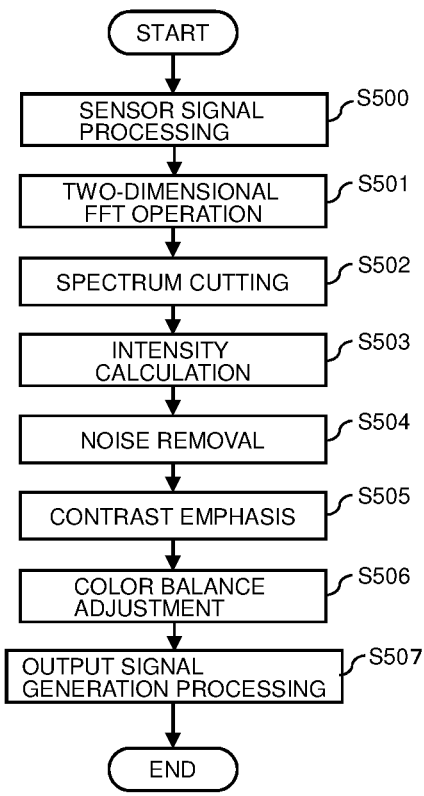
FIG. 3 is a flowchart illustrating an outline of image processing performed by an image processing unit.

Next, description will be given of an outline of image processing performed by the image processing unit 106 provided in the imaging device 101 in FIG. 1. FIG. 3 is a flowchart illustrating the outline of the image processing performed by the image processing unit 106. In FIG. 3, first, a moire fringe image for every RGB (red, green, and blue) component is generated from the signal output from the image sensor unit 103 by demosaicing processing or the like in processing of step S500. Next, with respect to the moire fringe image, a frequency spectrum is obtained for every RGB component by a two-dimensional Fourier transform operation such as fast Fourier transform (FFT) (S501).

Next, after cutting out data of a necessary frequency region in the frequency spectrum by the processing in step S501 (S502), intensity calculation of the frequency spectrum is performed to obtain an image (S503). Note that, here, for example, in the case of using a modulator having four sheets of patterns, intensities of two images having different phases are combined and the two images are output as one image. Here, processing until acquiring an image from signals obtained by the image sensor unit through frequency spectrum calculation, intensity calculation, and the like is referred to as development processing.

In addition, the obtained image is subjected to noise removal processing (S504), and contrast emphasizing processing (S505) and the like are subsequently performed. Then, color balance of the image is adjusted (S506), and is output as a captured image (S507). The image processing by the image processing unit 106 is terminated as described above.

Next, description will be given of imaging principle in the imaging device 101. First, the front surface side grating pattern 104 and the rear surface side grating pattern 105 having a concentric circle shape in which a pitch is narrowed in inversely proportional to a radius from the center as illustrated in FIG. 2 are defined as follows. In a laser interferometer, it is assumed a case where a spherical wave close to a plane wave and a plane wave that is used as reference light are caused to interfere with each other. When a radius from reference coordinates as the center of the concentric circle is set as r, and a phase of a spherical wave is set as $\phi(r)$, the phase can be expressed by Expression 1 by using a coefficient $\beta$ that determines the magnitude of a curve of a wave surface.

[Mathematical Formula 1]
$$\phi(r) = \beta r^2 \quad (1)$$

Even in the spherical wave, the reason why the phase is expressed by the square of the radius r is as follows. Since the spherical wave is a spherical wave close to a plane wave, approximation is possible only with expansion of the lowest order. When a plane wave is caused to interfere with light having the phase distribution, an intensity distribution of interference fringe as in Expression 2 is obtained.

[Mathematical Formula 2]
$$I(r) = \frac{1}{4}|exp\, i\phi(r)+1|^2 = \frac{1}{2}(1+cos\phi) = \frac{1}{2}(1+cos\beta r^2) \quad (2)$$

The intensity distribution becomes concentric fringes having a bright line at a radial position that satisfies Expression 3.

[Mathematical Formula 3]
$$\phi(r) = \beta r^2 = 2n\pi \quad (n = 0,1,2,\cdots) \quad (3)$$

When a pitch of the fringes is set as p, Expression 4 is obtained.

[Mathematical Formula 4]
$$p\frac{d}{dr}\phi(r) = 2p\beta r = 2\pi, \quad p(r) = \frac{\pi}{\beta r} \quad (4)$$

It can be seen that the pitch is narrowed in inversely proportional to the radius.

A plate having the fringes is called a Fresnel zone plate or a Gabor zone plate. A grating pattern having a transmittance distribution proportional to the intensity distribution defined by Expression 2 is used as the front surface side grating pattern 104 and the rear surface side grating pattern 105 as illustrated in FIG. 1.

Figure 4:
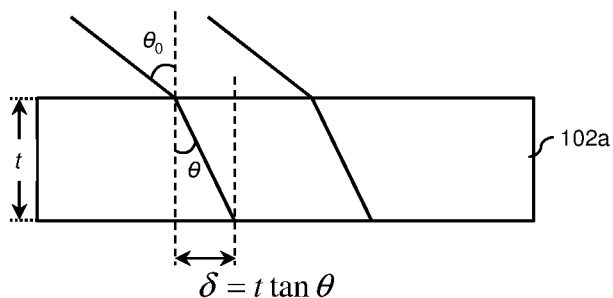
FIG. 4 is a view describing that a projection image from a front surface of a grating substrate to a rear surface thereof by obliquely incident parallel light causes in-plane deviation.

Here, an incident state will be described with reference to FIG. 4. FIG. 4 is a view illustrating an incident state.

It is assumed that parallel light is incident to the modulator 102, which has a thickness t and in which the grating pattern is formed on both surfaces, at an angle $\theta_0$ as illustrated in FIG. 4. When a refraction angle in the modulator 102 is set as $\theta$, geometrically and optically, light multiplied by the transmittance of the front surface grating is incident to the rear surface with a deviation of $\delta = t\cdot tan\theta$, and the centers of two concentric gratings are aligned, the transmittance of the rear surface grating is multiplied with a deviation by $\delta$.

[Mathematical Formula 5]
$$I(x,y)I(x+\delta,y) = \frac{1}{4}\left[1+cos\beta(x^2+y^2)\right]\left[1+cos\beta((x+\delta)^2+y^2)\right]$$
$$= \frac{1}{8}\left[2+4cos\beta(r^2+\delta x)cos\delta\beta x + cos2\beta(r^2+\delta x)+cos2\delta\beta x\right] \quad (5)$$

At this time, an intensity distribution as in Expression 5 is obtained.

It can be seen that the fourth term of the expansion creates straight and evenly spaced moire patterns on one surface of an overlapping region in a deviation direction of two gratings. A fringe that occurs at a relatively low spatial frequency due to overlapping of the moire patterns is called the moire fringe. The straight and evenly spaced fringes create a sharp peak in a spatial frequency distribution obtained by the two-dimensional Fourier transform of a detected image.

A value of $\delta$, that is, the incident angle $\theta$ of light rays can be obtained from a value of the frequency. It is clear that the moire fringes which are obtained over the entirety of a surface at an even interval occur at the same pitch from symmetry of arrangement of the concentric gratings without depending on a deviation direction. The reason why the fringes are obtained is because the grating patterns are formed by the Fresnel zone plate or the Gabor zone plate, but an arbitrary grating pattern may be used as long as moire fringes are obtained at an even interval over the entirety of a surface.

Here, when extracting only a component having a sharp peak from Expression 5 as in Expression 6,

[Mathematical Formula 6]
$$I(x,y) = \frac{1}{8}(2 + \cos 2\delta \beta x) \quad (6)$$

The Fourier spectrum becomes as in Expression 7.

[Mathematical Formula 7]
$$\mathcal{F}[I(x,y)] = \frac{1}{8}\mathcal{F}[2 + \cos 2\delta \beta x]$$
$$= \frac{1}{4}\delta(u,v) + \frac{1}{8}\delta\left(u + \frac{\delta\beta}{\pi}, v\right) + \frac{1}{8}\delta\left(u - \frac{\delta\beta}{\pi}, v\right) \quad (7)$$

Here, F represents Fourier transform operation, u and v represent spatial frequency coordinates in an x-direction and a y-direction, and δ accompanied with parentheses represents a delta function. As a result, it can be seen that in a spatial frequency spectrum of a detected image, a peak of a spatial frequency of the moire fringe occurs at a position of u = ±δβ/π. This state is illustrated in FIG. 5.

Figure 5:
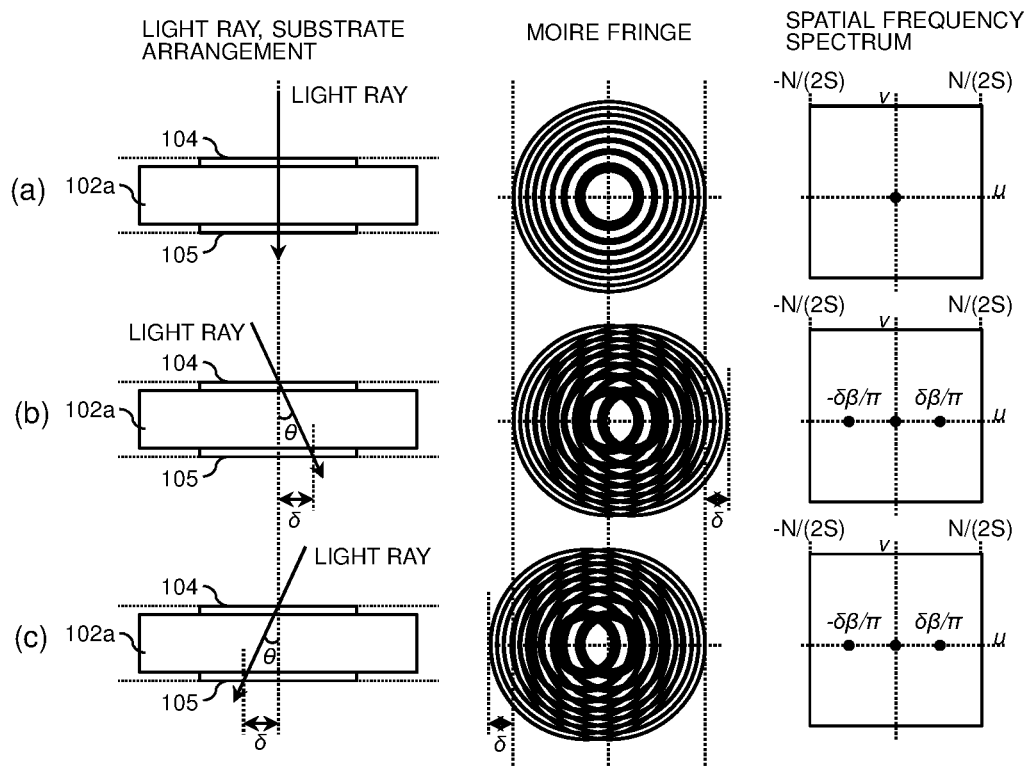
FIG. 5 is a schematic view describing generation of a moire fringe and a frequency spectrum in a case where axes of gratings on both surfaces of the grating substrate are provided.

FIG. 5 is a view illustrating an arrangement diagram of a light ray and the modulator 102, the moire fringe, and a schematic diagram of the spatial frequency spectrum, respectively. In FIG. 5, the arrangement diagram of the light ray and the modulator 102, the moire fringe, and the schematic diagram of the spatial frequency spectrum are illustrated from the left to the right. FIG. 5(a) illustrates vertical incidence, FIG. 5(b) illustrates a case where the light ray is incident from the left at an angle θ, and FIG. 5(c) illustrates a case where the light ray is incident from the right at an angle θ.

Axes of the front surface side grating pattern 104 formed on the front surface side of the modulator 102 and the rear surface side grating pattern 105 formed on the rear surface side are aligned. In FIG. 5(a), shadows of the front surface side grating pattern 104 and the rear surface side grating pattern 105 match each other, and thus a moire fringe does not occur.

In FIG. 5(b) and FIG. 5(c), a deviation between the front surface side grating pattern 104 and the rear surface side grating pattern 105 is even, the same moire occurs, and peak positions of the spatial frequency spectrum match each other, and it is difficult to determine whether the incident angle of the light ray is the case of FIG. 5(b) or the case of FIG. 5(c) from the spatial frequency spectrum. To avoid this, description will be given by using FIG. 6.

Figure 6:
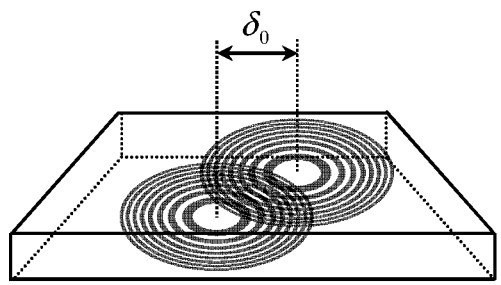
FIG. 6 is a schematic view in a case where the axes of the front surface grating and rear surface grating are arranged to deviate from each other.

FIG. 6 is a view illustrating an arrangement example of the grating patterns. As illustrated in FIG. 6, it is necessary to arrange two grating patterns, that is, the front surface side grating pattern 104 and the rear surface side grating pattern 105 to deviate relatively with respect to an optical axis so that shadows of the two grating patterns overlap with a deviation also with respect to a light lay that is vertically incident to the modulator 102. When a relative deviation of shadows of the two grating with respect to a vertically incident plane wave on the axis is set as δ0, a deviation δ of the incident angle θ due to the plane wave can be expressed by Expression 8.

[Mathematical Formula 8]
$$\delta = \delta_0 + t \tan \theta \quad (8)$$

At this time, a peak of the spatial frequency spectrum of a moire fringe of a light ray with an incident angle θ becomes a position expressed by Expression 9 on a positive side of the frequency.

[Mathematical Formula 9]
$$u = \frac{\delta \beta}{\pi} = \frac{1}{\pi}(\delta_0 + t \tan \theta)\beta \quad (9)$$

When the size of the image sensor is set as S, and the number of pixels of the image sensor in the x-direction and the y-direction are set as N, the spatial frequency spectrum of a discrete image by the two-dimensional Fourier transform is obtained in a range of from -N/(2S) to +N/(2S).

When considering that light is received in a state in which a positive-side incident angle and a negative-side incident angle are even, a spectrum peak position of the moire fringe due to the vertically incident plane wave (θ = 0) is appropriately set to the central position with the origin (DC: DC component) position, for example, a frequency position of a positive-side end, that is, a spatial frequency position of Expression 10.

[Mathematical Formula 10]
$$\frac{\delta_0 \beta}{\pi} = \frac{N}{4S} \quad (10)$$

Accordingly, a relative central position deviation between the two gratings is appropriately set to Expression 11.

[Mathematical Formula 11]
$$\delta_0 = \frac{\pi N}{4\beta S} \quad (11)$$

Figure 7:
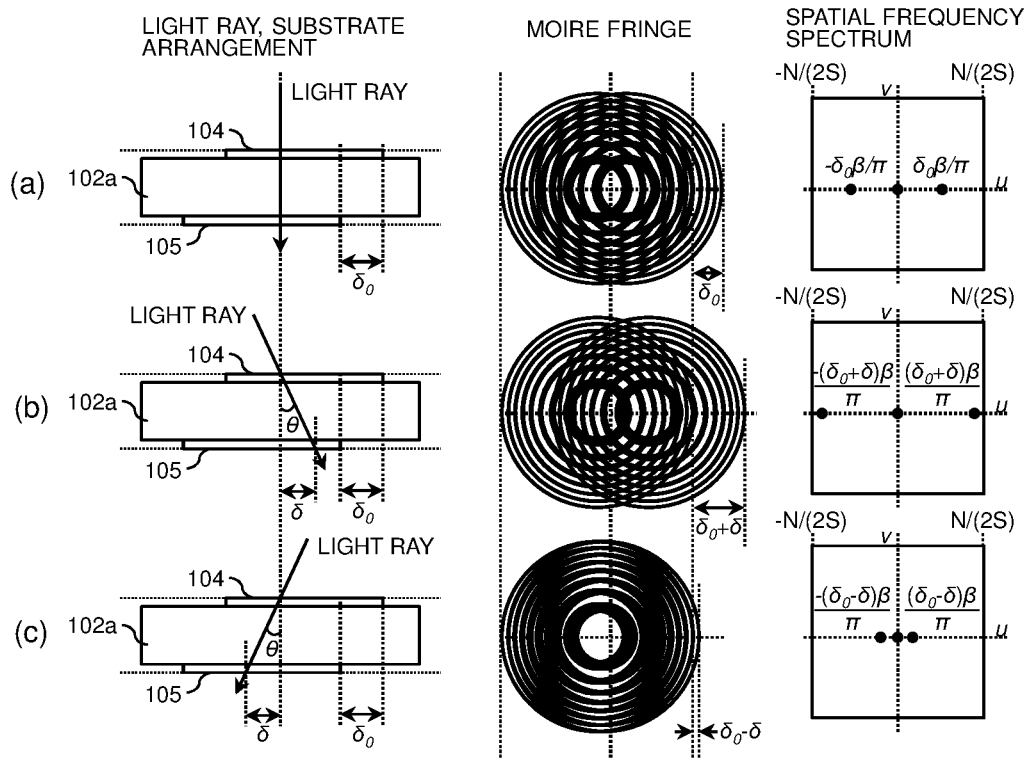
FIG. 7 is a schematic view describing generation of the moire fringe and the frequency spectrum in a case where the gratings on the both surfaces of the grating substrate are arranged to deviate from each other.

FIG. 7 is a schematic view describing moire fringe generation and a frequency spectrum in a case where the front surface side grating pattern 104 and the rear surface side grating pattern 105 are disposed to deviate from each other. As in FIG. 5, the left side illustrates an arrangement diagram of a light ray and the modulator 102, a central column represents a moire fringe, and the right side represents a spatial frequency spectrum. In addition, FIG. 7(a) represents a case where the light ray is vertically incident, FIG. 7(b) represents a case where the light ray is incident from the left side at an angle θ, and FIG. 7(c) represents a case where the light ray is incident form the right side at an angle θ.

The front surface side grating pattern 104 and the rear surface side grating pattern 105 are arranged to deviate by δ0 in advance. Accordingly, even in FIG. 7(a), the moire fringe occurs, and a peak appears in the spatial frequency spectrum. The deviation amount δ0 is set so that the peak position is shown at the center of a spectrum range on one side from the origin as described above.

At this time, in FIG. 7(b), the deviation δ is set to further increase, and in FIG. 7(c), the deviation δ is set to decrease, and thus a difference between FIG. 7(b) and FIG. 7(c) can be discriminated from a spectrum peak position differently from FIG. 5. A spectrum image of the peak is a bright spot indicating infinite luminous flux, and is not different from an image captured by the imaging device 101 in FIG. 1.

When a maximum angle of an incident angle of parallel light that can be received is set as θmax, from Expression 12, $$u_{max} = \frac{1}{\pi}(\delta_o + t\, tan\, \theta_{max})\beta = \frac{N}{2S} \quad (12)$$

[Mathematical Formula 12]

A maximum angle of view with which the imaging device 101 can receive light is given by Expression 13.

$$tan\, \theta_{max} = \frac{\pi N}{4t\beta S} \quad (13)$$

[Mathematical Formula 13]

From analogy with imaging using a typical lens, when considering that parallel light with an angle of view θmax is focused and received at an edge of the image sensor, it can be considered that an effective focal length of the imaging device 101 that does not use a lens corresponds to Expression 14.

$$f_{eff} = \frac{S}{2\, tan\, \theta_{max}} = \frac{2t\beta S^2}{\pi N} \quad (14)$$

[Mathematical Formula 14]

Here, From Expression 13, it can be seen that the angle of view can be changed by the thickness t of the modulator 102, and a coefficient β of the front surface side grating pattern 104 and the rear surface side grating pattern 105. Accordingly, for example, when the modulator 102 has a configuration in which the front surface side grating pattern 104 and the rear surface side grating pattern 105 are formed as a thin film, and are supported by a support member, and a length of the support member, that is, the thickness t can be changed, at the time of imaging, the imaging can be performed while changing the angle of view.

In the above description, the incident light rays have only one incident angle in any case, but actually, in order for the imaging device 101 operates as a camera, it is necessary to assume a case where light rays with a plurality of incident angles are simultaneously incident. The light rays with the plurality of incident angles cause images of a plurality of front-side gratings to overlap each other already at a point of time incident to the rear surface side grating patterns. If the images generate the moire fringe, there is a concern that the moire fringe becomes a noise hindering detection of a moire fringe with the rear surface side grating pattern 105 which is a signal component.

However, actually, overlapping of images of the front surface side grating pattern 104 does not generate a peak of a moire image, and the peak is generated only by overlapping with the rear surface side grating pattern 105. The reason will be described below.

First, the major difference is that overlapping of shadows of the front surface side grating pattern 104 due to light rays with a plurality of incident angles is not a product but a sum. In overlapping of a shadow of the front surface side grating pattern 104 due to light with one incident angle and the rear surface side grating pattern 105, an intensity distribution of light that is the shadow of the front surface side grating pattern 104 is multiplied by a transmittance of the rear surface side grating pattern 105, and thus light intensity distribution after transmitting through the rear surface side grating pattern 105 is obtained.

In contrast, overlapping of shadows due to light rays incident to the front surface side grating pattern 104 at a plurality of incident angles different from each other, the light rays overlap each other is a sum instead of a product because the light rays overlap each other. In the case of the sum, as in Expression 15, $$I(x,y) + I(x+\delta, y) = \frac{1}{2}\left[1 + cos\beta(x^2 + y^2)\right] + \frac{1}{2}\left[1 + cos\beta((x+\delta)^2 + y^2)\right]$$
$$= 1 + cos\left[\beta(r^2 + \delta x)\right]cos\delta\beta x \quad (15)$$

[Mathematical Formula 15]

A distribution is obtained by multiplying the distribution of gratings of the Fresnel zone plate by a distribution of moire fringes. Accordingly, the frequency spectrum is expressed by an overlapping integral of respective frequency spectrums.

Accordingly, even though a moire spectrum alone has a sharp peak, actually, only a ghost of a frequency spectrum of the Fresnel zone plate occurs at the position. That is, a sharp peak does not occur at the spectrum. Accordingly, with regard to a spectrum of a moire image that is detected even when light rays with a plurality of incident angles are input, in a case where only a moire of the product of the front surface side grating pattern 104 and the rear surface side grating pattern 105 exists and the rear surface side grating pattern 105 is single, only one spectrum peak is detected with respect to one incident angle.

Figure 8:
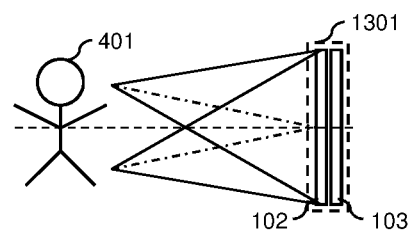
FIG. 8 is a view describing an angle made between light from respective points which constitute an object and a sensor.

Here, schematic description will be given of correspondence with the parallel light which has been described so far for detection, and light from an actual object with reference to FIG. 8. FIG. 8 is a view describing an angle that is made by light from respective points which constitute the object with respect to the image sensor.

Light from each point that constitutes a subject 401 is a spherical wave from a point light source, and is incident to the modulator 102 and the image sensor unit 103 (hereinafter, referred to as a grating sensor body substrate 1301 in FIG. 8) of the imaging device 101 in FIG. 1. At this time, in a case where the grating sensor body substrate is sufficiently small with respect to the subject 401, or is sufficient distant from the subject 401, it can be considered that incident angle of light rays emitted to the grating sensor body substrate from respective points are the same as each other.

Since a spatial frequency displacement Δu of a moire with respect to a minute angle displacement Δθ obtained Expression 9 is equal to or less 1/S that is minimum resolution of the spatial frequency of the image sensor, a condition in which Δθ can be regarded as the parallel light is expressed by Expression 16.

$$\Delta u = \frac{1}{\pi}\beta t\Delta\theta \leq \frac{1}{S}, \quad \Delta\theta \leq \frac{\pi}{S\beta t} \quad (16)$$

[Mathematical Formula 16]

Under the condition, an image of an infinite object can be captured by the imaging device having the present configuration.

Figure 9:
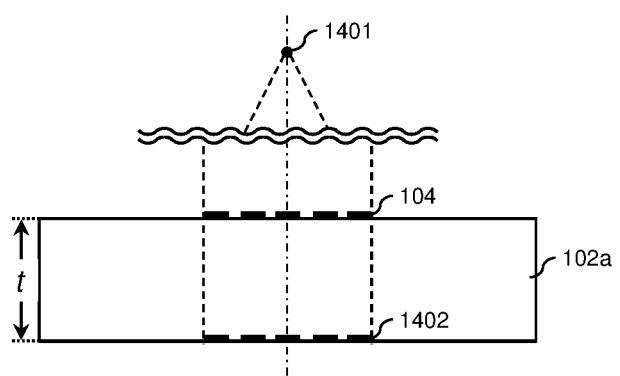
FIG. 9 is a view illustrating that a front side grating pattern is projected in a case where an object is at an infinite distance.
Figure 10:
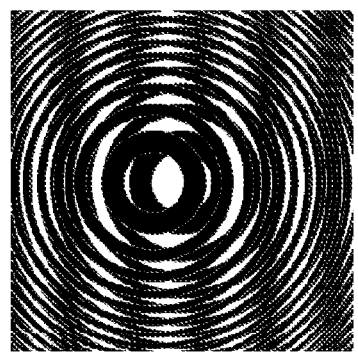
FIG. 10 is a view illustrating an example of a moire fringe that is generated in a case where an object is at an infinite distance.

Here, a state of projection to the rear surface of the front surface side grating pattern 104 in the infinite case described so far is illustrated in FIG. 9. In FIG. 9, a spherical wave from a point 1401 that constitutes an infinite object becomes a plane wave while propagating along a sufficiently long distance, and is emitted to the front surface side grating pattern 104, and a projection image 1402 is projected to a lower surface. In this case, the projection image has approximately the same shape as that of the front surface side grating pattern 104. As a result, the projection image 1402 is multiplied by a transmittance distribution of the rear surface side grating pattern (corresponding to the rear surface side grating pattern 105 in FIG. 2), and thus linear moire fringes at equal intervals can be obtained as illustrated in FIG. 10.

Figure 11:
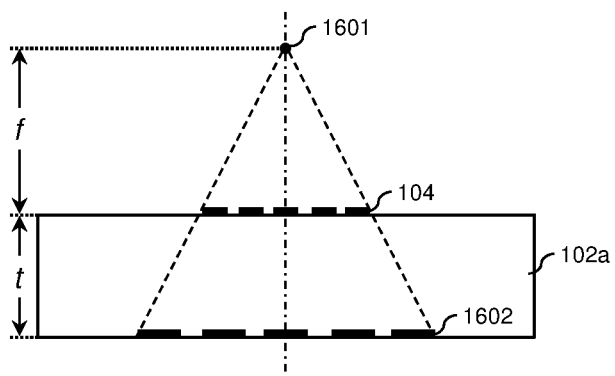
FIG. 11 is a view illustrating that the front side grating pattern is enlarged in a case where an object is at a finite distance.

On the other hand, imaging with respect to a finite object will be described. FIG. 11 is a view describing that the projection to the rear surface of the front surface side grating pattern 104 is enlarged in comparison to the front surface side grating pattern 104 in a case where an object to be imaged exists at a finite distance. As illustrated in FIG. 11, in a case where a spherical wave from a point 1601 that constitutes an object is emitted to the front surface side grating pattern 104, and a projection image 1602 thereof is projected to a lower surface, the projection image is enlarged almost uniformly. Note that, an enlargement ratio α can be calculated by using a distance f from the front surface side grating pattern 104 to the point 1601 as in Expression 17.

[Mathematical Formula 17]
$$\alpha = \frac{f+t}{f} \quad (17)$$

Figure 12:
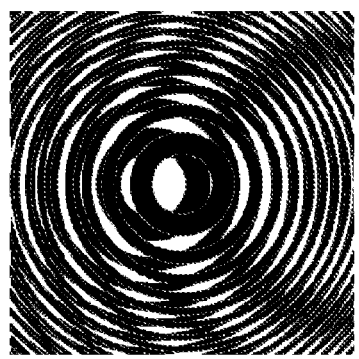
FIG. 12 is a view illustrating an example of the moire fringe that is generated in a case where an object is at a finite distance.
Figure 13:
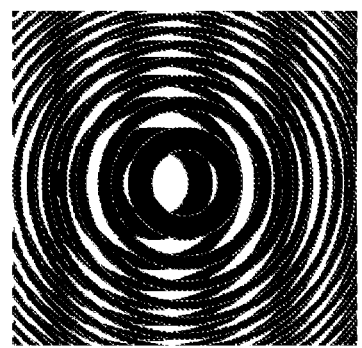
FIG. 13 is a view illustrating an example of the moire fringe in which the rear surface grating pattern is corrected in a case where an object is at a finite distance.

Accordingly, as illustrated in FIG. 12, if a transmittance distribution of the rear surface side grating pattern designed with respect to a parallel light is multiplied as is, linear moire fringes at equal intervals do not occur. However, when the rear surface side grating pattern 105 is enlarged in conformity to a shadow of the front surface side grating pattern 104 which is uniformly enlarged, with respect to a projection image 1602 enlarged as illustrated in FIG. 13, it is possible to generates linear moire fringes at equal distances again. For this, a coefficient β of the rear surface side grating pattern 105 can be corrected to β/α2.

According to this, it is possible to selectively develop light from the point 1601 at a distance that is not necessarily infinite. As a result, imaging can be performed with focus to an arbitrary position.

Figure 14:
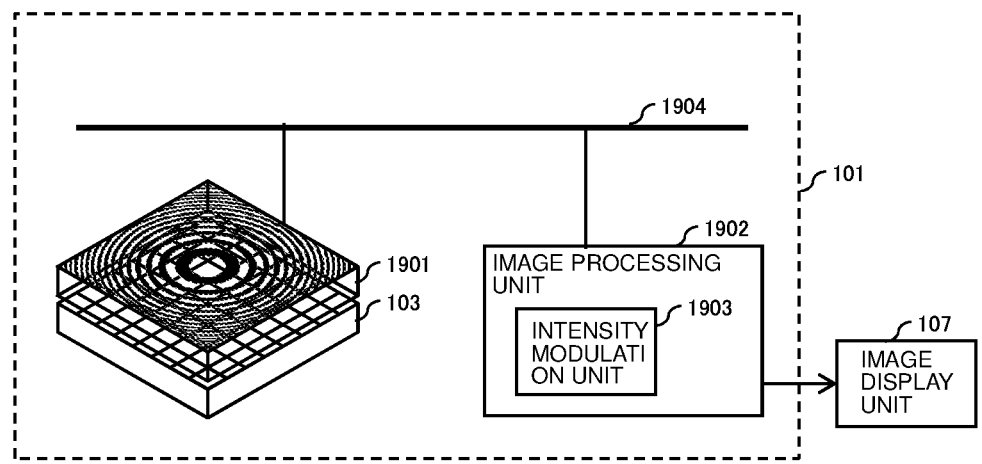
FIG. 14 is a view illustrating an example that realizes the rear surface grating pattern by image processing.

Next, description will be given of a method of simplifying a configuration of the modulator 102. In the modulator 102, the front surface side grating pattern 104 and the rear surface side grating pattern 105 having the same shape are formed on the front surface and the rear surface of the grating substrate 102a to deviate from each other, and an angle of the incident parallel light is detected from the spatial frequency spectrum of the moire fringe to develop an image. The rear surface side grating pattern 105 is an optical element that is in close contact with the image sensor unit 103 and modulates light intensity of incident light, and is the same grating pattern regardless of the incident light. Here, as illustrated in FIG. 14, processing corresponding to the rear surface side grating pattern 105 may be executed by an intensity modulation unit 1903 in an image processing unit 1902 by using the modulator 1901 from which the rear surface side grating pattern 105 is removed. For example, the image sensor unit 103 and the image processing unit 1902 are connected to each other with a bus 1904.

Figure 15:
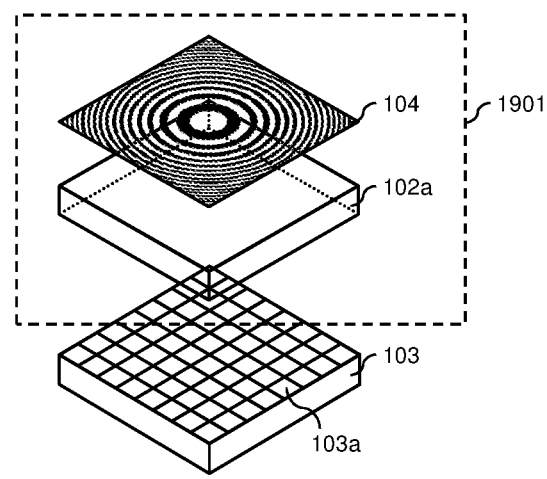
FIG. 15 is a view illustrating a modulator of an example in which the rear surface grating pattern is realized by imaging processing.

Details of a configuration of the modulator 1901 at this time are illustrated in FIG. 15. Due to the configuration, the number of the grating patterns formed on the grating substrate 102a can be reduced by one. According to this, the manufacturing cost of the modulator can be reduced, and light using efficiency can also be improved.

Figure 16:
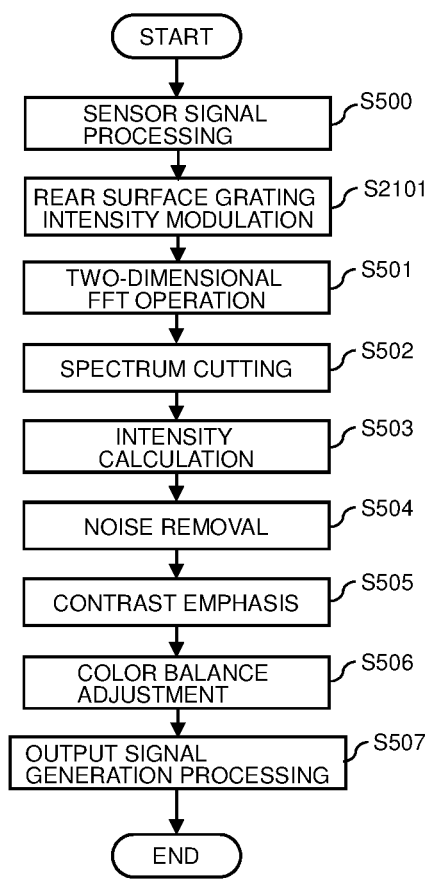
FIG. 16 is a view illustrating a processing flow of an image processing unit of an example in which the rear surface grating pattern is realized by image processing.

FIG. 16 is a flowchart illustrating an outline of image processing by the image processing unit 1902 in FIG. 14. The flowchart in FIG. 16 is different from the flowchart in FIG. 3 in processing in step S2101. In the processing in step S2101, with respect to an image output from the image sensor unit 103 by the intensity modulation unit 1903, the image processing unit 1902 generates a moire fringe image corresponding to transmission through the rear surface side grating pattern 105. Specifically, since an operation corresponding to Expression 5 may be performed, the image processing unit 1902 may generate the rear surface side grating pattern 105 in the intensity modulation unit 1903, and may multiply an image of the image sensor unit 103 by the rear surface side grating pattern 105. In addition, in a case where the rear surface side grating pattern 105 is a binarized pattern, it can be realized only by setting a value of the image sensor unit 103 in a region corresponding to black to 0. According to this, the scale of a multiplication circuit can be suppressed. Hereinafter, processing in steps S501 to S507 in FIG. 16 are the same as in the processing in FIG. 3, and thus description will be omitted here.

Note that, the processing corresponding to the rear surface side grating pattern 105 is realized by the intensity modulation unit 1903. However, since the rear surface side grating pattern 105 is an optical element that is in close contact with the sensor and modulates the intensity of incident light, the processing can be realized by setting the sensitivity of the sensor by effectively adding a transmittance of the rear surface side grating pattern 105.

Figure 17:
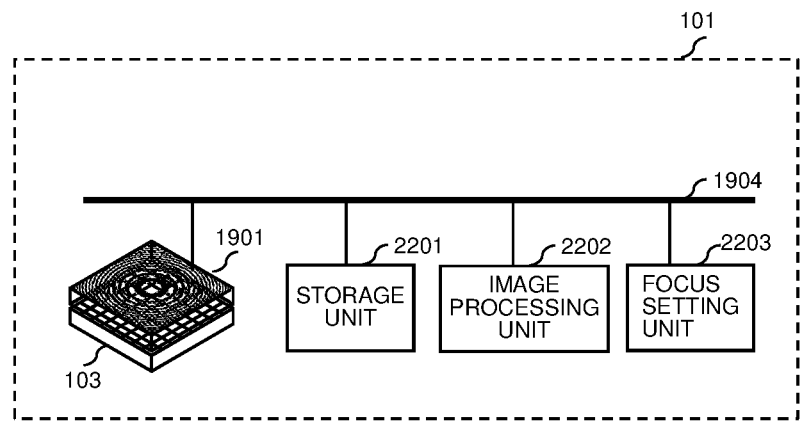
FIG. 17 is a view illustrating an example of realizing refocusing.

According to the above-described configuration in which the rear surface side grating pattern 105 is carried out by the image processing unit, it is possible to match a focus to an arbitrary distance after imaging. A configuration of this case is illustrated in FIG. 17. FIG. 17 is different from FIG. 14 in a storage unit 2201, an image processing unit 2202, and a focus setting unit 2203. For example, the storage unit 2201 is temporarily stores an image output from the image sensor unit 103 so as to realize focus adjustment after imaging. In addition, the focus setting unit 2203 can set a focus distance by a knob provided in the imaging device 101, a graphical user interface (GUI) of a smart phone, or the like, and outputs focus distance information (known distance information for adjusting arbitrary distance focus) to the image processing unit 2202.

Figure 18:
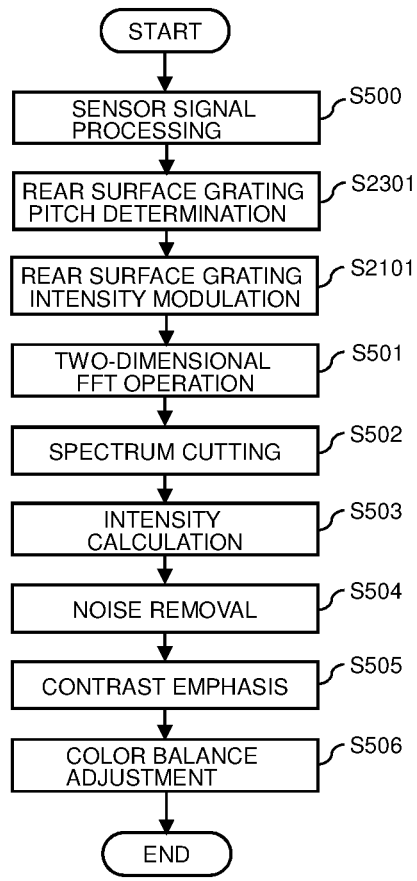
FIG. 18 is a view illustrating a processing flow of the image processing unit of the example of realizing refocusing.

FIG. 18 is a flowchart illustrating an outline of image processing by the image processing unit 2202 in FIG. 17. FIG. 18 is different from FIG. 16 in processing in step S2301. In the processing in step S2301, an enlargement rate α is calculated from Expression 17 on the basis of focus distance information output from the focus setting unit 2203, and performs calculation of setting the coefficient β of the rear surface side grating pattern 105 to β/α. Then, in S2101, a moire fringe image corresponding to transmittance through the rear surface side grating pattern is generated on the basis of the coefficient. Then, processing in steps S501 to S506 in FIG. 18 is the same processing as in FIG. 3, and thus description thereof will be omitted here.

According to the above-described method and configuration, an object image of an external world can be obtained by simple operation such as a fast Fourier transform, and the focus can be adjusted to an arbitrary distance after imaging. In a camera of the related art, re-imaging is necessary to change the focus, but in this configuration, only one imaging is necessary.

In the above description, description has been focused to Expression 6 in which only a component having a sharp peak is extracted from Expression 5, but actually, a term other than the fourth term in Expression 5 becomes a noise. Here, noise cancellation based on fringe scanning is effective.

First, in the interference fringe intensity distribution in Expression 2, when an initial phase of the front surface side grating pattern 104 is set as $\Phi F$ and an initial phase of the rear surface side grating pattern 105 is set as $\Phi B$, Expression 5 can be expressed as in Expression 18.

[Mathematical Formula 18]
$$I(x,y)I(x+\delta,y) = \frac{1}{4}\left\{1+\cos\left[\beta(x^2+y^2)+\Phi_B\right]\right\}$$
$$\left\{1+\cos\left[\beta((x+\delta)^2+y^2)+\Phi_F\right]\right\} \quad (18)$$

Here, when integrating Expression 18 with respect to $\Phi F$ and $\Phi B$ by using orthogonality of a trigonometric function as in Expression 19,

[Mathematical Formula 19]
$$\iint_0^{2\pi} I(x,y)I(x+\delta,y)\cdot\cos(\Phi_B-\Phi_F)d\Phi_B d\Phi_F = \frac{\pi^2}{4}\cos(2\beta\delta x+\beta\delta^2) \quad (19)$$

A noise term is cancelled, and thus a term of integral multiple of a single frequency remains. From the above discussion, when the term is Fourier transformed, a sharp peak without noise is generated in the spatial frequency distribution.

Here, Expression 19 is shown in the form of integration, but actually, the same effect is obtained by calculating the sum of combinations of $\Phi F$ and $\Phi B$. The $\Phi F$ and $\Phi B$ may be set to divide an angle between 0 and $2\pi$ into equal parts, and equal division into four parts such as $\{0, \pi/2, \pi, 3\pi/2\}$ or equal division into three parts such as $\{0, \pi/3, 2\pi/3\}$ is also possible.

Figure 19:
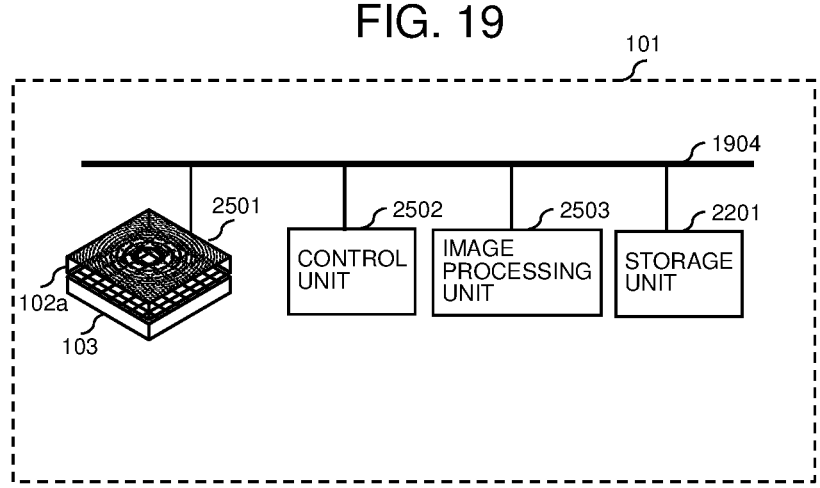
FIG. 19 is a view illustrating an example of realizing time-division fringe scanning.

In addition, Expression 19 can be simplified. In Expression 19, $\phi F$ and $\phi B$ are calculated so that $\Phi F$ and $\Phi B$ are changed independently, but even when applying $\Phi F = \Phi B$, that is, the same phase to the initial phases of the front surface side grating pattern 104 and the rear surface side grating pattern 105, the noise term can be cancelled. In FIG. 19, in the case of $\Phi F = \Phi B = \Phi$, Expression 20 is obtained.

[Mathematical Formula 20]
$$\int_0^{2\pi} I(x,y)I(x+\delta,y)d\Phi = \frac{\pi}{4}\left[2+\cos(2\beta\delta x+\beta\delta^2)\right] \quad (20)$$

Accordingly, the noise term is cancelled, and a term of an integral multiple of a single frequency remains. In addition, $\Phi$ may be set to equally divide the angle between 0 and $2\pi$, and the angle may be equally divided into four parts such as $\{0, \pi/2, \pi, 3\pi/2\}$.

In addition, even though the angle is not divided into equal parts, the noise term can be cancelled even when using a phase orthogonal to $\{0, \pi/2\}$, and simplification is realized. First, as in the configuration of FIG. 14, when the rear surface side grating pattern 105 is carried out by the image processing unit 1902, a negative value can be handled dealt for the rear surface side grating pattern 105, and thus Expression 18 become Expression 21 ($\Phi F = \Phi B = \Phi$).

[Mathematical Formula 21]
$$I(x,y)I(x+\delta,y) = \frac{1}{4}\cos\left[\beta(x^2+y^2)+\Phi\right]\left\{1+\cos\left[\beta((x+\delta)^2+y^2)+\Phi\right]\right\} \quad (21)$$

Since the rear surface side grating pattern 105 is known already, when the rear surface side grating pattern 105 is subtracted from Expression 21, and is added in the case of $\Phi = \{0, \pi/2\}$, as in Expression 22,

[Mathematical Formula 22]
$$\left[I(x,y)I(x+\delta,y)-I(x,y)\right]\big|_{\Phi=0} + \left[I(x,y)I(x+\delta,y)-I(x,y)\right]\big|_{\Phi=\frac{\pi}{2}} =$$
$$\frac{1}{4}\cos(2\beta\delta x+\beta\delta^2) \quad (22)$$

The noise term is cancelled, and a term of an integral multiple of a single frequency remains.

In addition, as described above, the front surface side grating pattern 104 and the rear surface side grating pattern 105 are arranged to deviate from each other by $\delta 0$ in advance to separate two development images generated in the spatial frequency space. However, in this method, there is a problem that the number of pixels of the development images is halved. Here, description will be given of a method of avoiding overlapping of the development images without deviation of $\delta 0$. In fringe scanning of FIG. 19, operation is performed on a complex plane by using "exp" as in Expression 23 instead of "cos".

[Mathematical Formula 23]
$$\iint_0^{2\pi} I(x,y)I(x+\delta,y)\cdot e^{i(\Phi_B-\Phi_F)}d\Phi_B d\Phi_F = \frac{\pi^2}{4}e^{i(2\beta\delta x+\beta\delta^2)} \quad (23)$$

According to this, a noise term is cancelled, and a term of an integral multiple of a single frequency remains. When $\exp(2i\beta\delta x)$ in Expression 23 is Fourier-transformed, Expression 24 is obtained.

[Mathematical Formula 24]
$$\mathcal{F}\left[e^{i2\beta\delta x}\right] = \delta(u+2\delta\beta, v) \quad (24)$$

It can be seen that two peaks as in Expression 7 do not occur, and a single development image is obtained. In this manner, it is not necessary for the front surface side grating pattern 104 and the rear surface side grating pattern 105 to be arranged to deviate from each other, and the number of pixels can be effectively used.

A configuration of the noise cancellation method based on the fringe scanning will be described with reference to FIGS. 19 to 28. In the fringe scanning, it is necessary to use a plurality of patterns different in an initial phase at least as the front surface side grating pattern 104. As a method for realizing this, there are a method of switching patterns in time-division manner, and a method of switching patterns in a space-division manner.

FIG. 19 illustrates a configuration of realizing the time-division fringe scanning. In FIG. 19, a reference numeral 2501 indicates a modulator, a reference numeral 2502 indicates a control unit, and a reference numeral 2503 indicates an image processing unit. The control unit 2502 collectively controls the image sensor unit 103, the modulator 2501, the image processing unit 2503, and the like.

Figure 20:
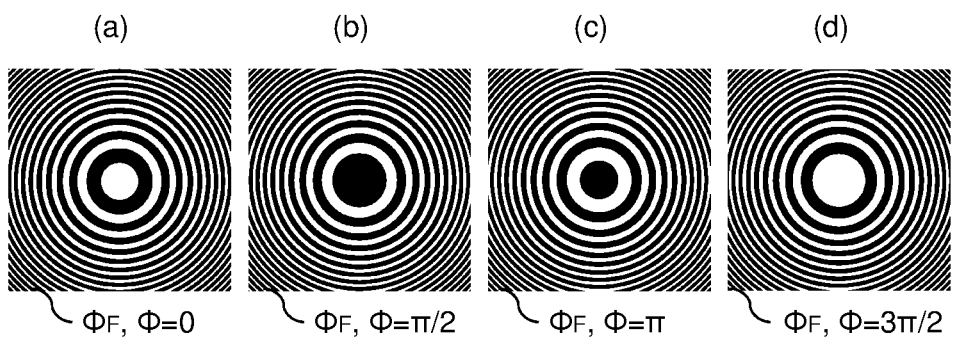
FIG. 20 is a view illustrating an example of the grating pattern in the time-division fringe scanning.

For example, the modulator 2501 is a liquid display element or the like that can perform display (phase shift) by electrically switching a plurality of initial phases illustrated in FIG. 20. In patterns in FIGS. 20(a) to 20(d), initial phases ΦF or Φ are set to {0, π/2, π, 3π/2}, respectively.

As illustrated in FIG. 20, each of the patterns in FIGS. 20(a) to 20(d) is constituted by a plurality of lines. The pattern in FIG. 20(a) corresponds to a first grating pattern, and a pattern in FIG. 20(c) corresponds to a second grating pattern having a phase deviating from a phase of the first grating pattern by π. In addition, the pattern in FIG. 20(b) corresponds to a third grating pattern having a phase deviating from the phase of the first grating pattern by π/2, and a pattern in FIG. 20(d) corresponds to a fourth grating pattern having a phase deviating from the phase of the first grating pattern by 3π/2.

The grating pattern illustrated in FIG. 20 is constituted by a plurality of concentric circles, and in the plurality of concentric circles, a pitch of the concentric circles is narrowed in inversely proportional to reference coordinates as the center of the concentric circles.

Figure 24:
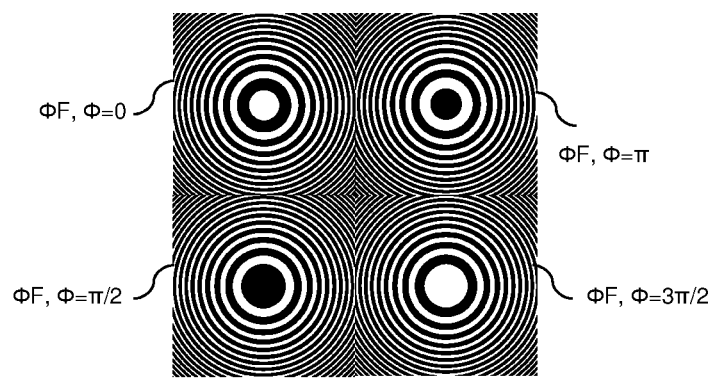
FIG. 24 is a view illustrating an example of the grating pattern in the space-division fringe scanning.
Figure 25:
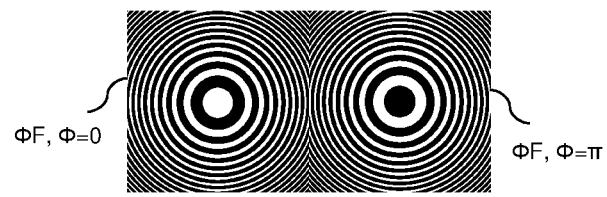
FIG. 25 is a view illustrating an example of the grating pattern in the space-division fringe scanning.

Note that, as illustrated in FIG. 24, grating pattern of the modulator 2501 may be constituted by a plurality of straight lines, and in the plurality of straight lines, a distance between straight lines may be narrowed in inversely proportional to the reference coordinates.

Figure 21:
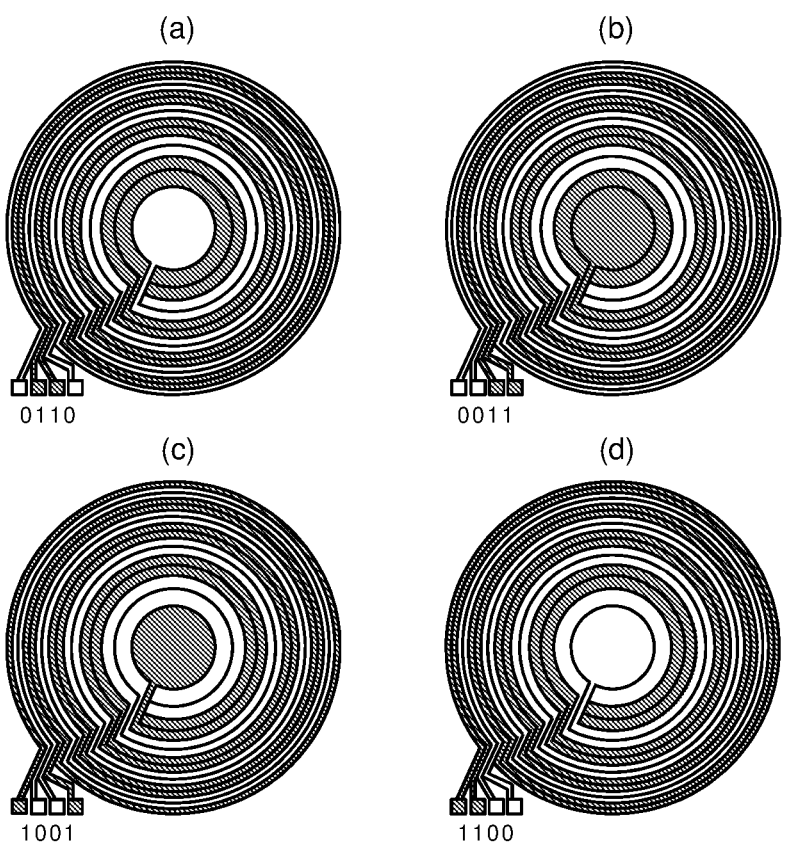
FIG. 21 is a view illustrating an example of the modulator in the time-division fringe scanning.

An example of an electrode arrangement in the liquid crystal display element of the modulator 2501 for realizing the grating pattern illustrated in FIG. 20 is illustrated in FIG. 21. Electrodes having a concentric circle shape are configured to divide a cycle of the grating pattern into four parts, electrodes are wired for every four pieces from an inner side, and the four electrodes are drawn out from an outer peripheral portion as drive terminals. A voltage state applied to the four electrodes is temporarily switched between two states of "0" and "1", and thus it is possible to switch the initial phases ΦF or Φ of the grating pattern into {0, π/2, π, 3π/2} as illustrated in FIGS. 21(a) to 21(d).

Note that, in FIG. 21, an electrode which is shown with half-tone dot meshing and to which "1" is applied corresponds to shielding of light, and an electrode which is shown with white and to which "0" is applied corresponds to transmission of light.

Figure 22:
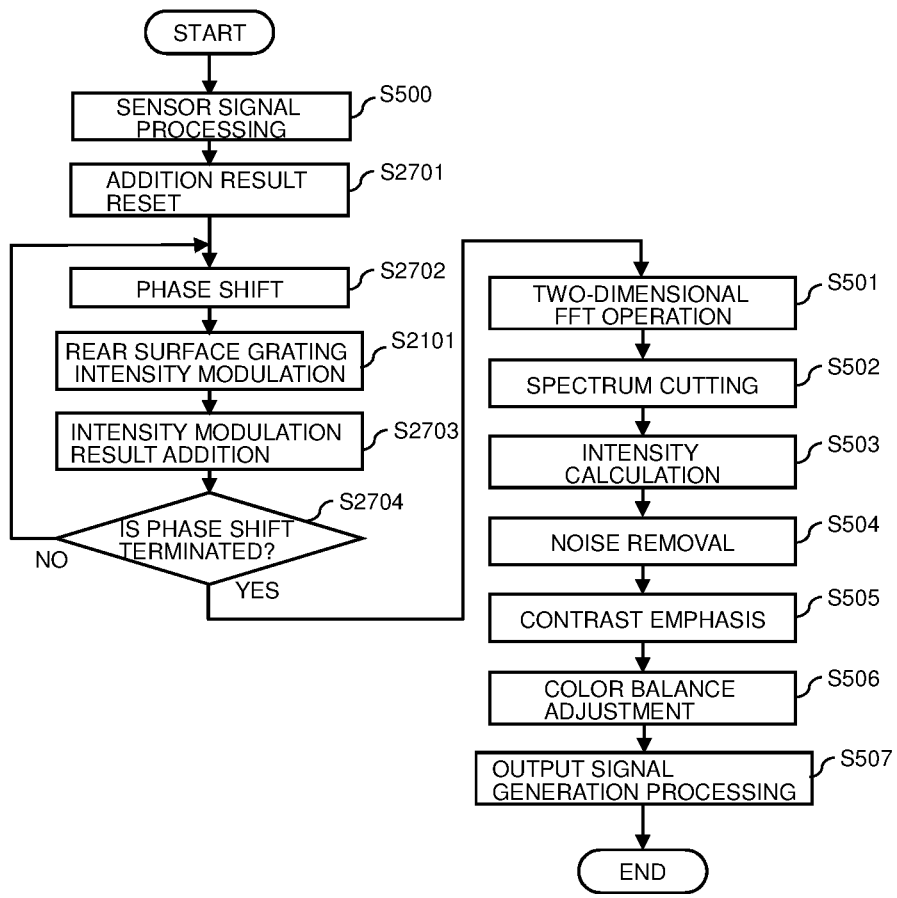
FIG. 22 is a view illustrating a processing flow of the image processing unit in an example of realizing the time-division fringe scanning.

Next, FIG. 22 illustrates a flowchart illustrating an outline of image processing in the image processing unit 2503. The flowchart in FIG. 22 is different from the flowchart in FIG. 16 in processing in steps S2701 to S2704. First, the image processing unit 2503 resets an addition result at the beginning of a fringe scanning operation (S2701). Next, in the case of corresponding to Expression 20, the image processing unit 2503 performs setting to the same initial phase as in the front surface side grating pattern 104 which is used in imaging (S2702), generates the rear surface side grating pattern 105 having the initial phase, and multiplies an image of the image sensor unit 103 by the rear surface side grating pattern 105 (S2101).

The image processing unit 2503 adds the result for every initial phase pattern (S2703). The processing of steps S2702 to S2703 is repeated by the number of patterns of the initial phase (S2704). The subsequent processing is the same as the processing in FIG. 16 and thus description thereof will be omitted here. Note that, the flow has been described with reference to Expression 20, but the flow is also applicable to Expressions 19, 22, and 23.

Figure 23:
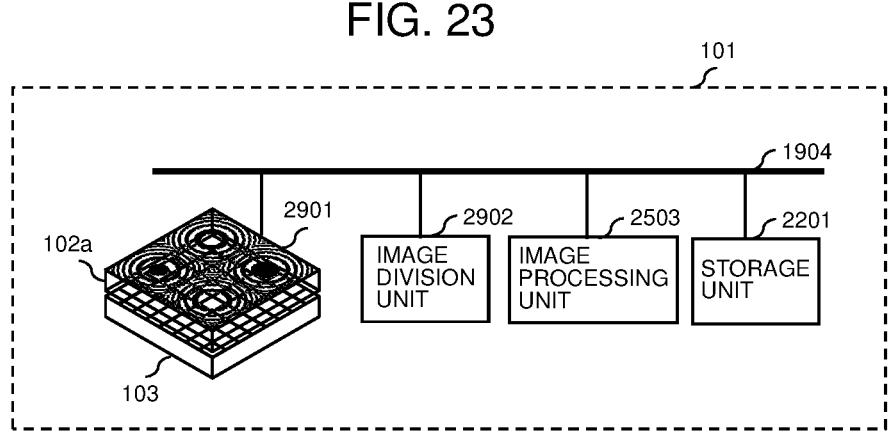
FIG. 23 is a view illustrating an example of realizing space-division fringe scanning.

A configuration for realizing space-division fringe scanning is illustrated in FIG. 23. For example, a modulator 2901 has a configuration in which a plurality of initial phase patterns are two-dimensionally arranged in a line as in a pattern in which initial phases ΦF or Φ in FIG. 24 are {0, π/2, π, 3π/2}.

An image division unit 2902 divides an output of the image sensor unit 103 into regions corresponding to the pattern arrangement of the modulator 2901, and sequentially transmits the output to an image processing unit 2503. In an example of FIG. 24, the output of the image sensor is divided into 2×2 regions.

In the fringe scanning based on Expression 20, since four phases are necessary, the modulator 2801 is set to 2×2. However, in the fringe scanning based on Expression 22 is realized by two phases, and thus the modulator 2901 can be realized even in 1×2 pattern arrangement. A configuration having patterns in which initial phases ΦF or Φ are {0, π} are two-dimensionally arranged in a line is exemplified. The output of the image sensor is divided into 1×2 regions in correspondence with the number of phases. The subsequent processing of the image processing unit 2503 is the same as the processing in FIG. 22 which is the time-division fringe scanning, and thus description thereof will be omitted.

When using the space-division fringe scanning, it is not necessary to perform electric switching as in the modulator 2501 in the time-division fringe scanning, and the modulator can be manufactured at low cost. In addition, in the space-division fringe scanning, in an image sensor in which a shutter on one screen is set to the same timing, imaging timing of four phases or two phases is the same in each case, and thus imaging of a moving body is possible. In the four phases, an image after development has higher image quality in comparison to the two phases, but in the two phases, a processing amount may be further reduced in comparison to the four phases. In addition, in the two phases, a CMOS-type image sensor in which shutter timing is different for every horizontal line can be used to capture a moving image. However, when using the space-division fringe scanning, since an image is divided, resolution is effectively lowered. Accordingly, the time-division fringe scanning is suitable for imaging a stationary object that requires high resolution.

Figure 26:
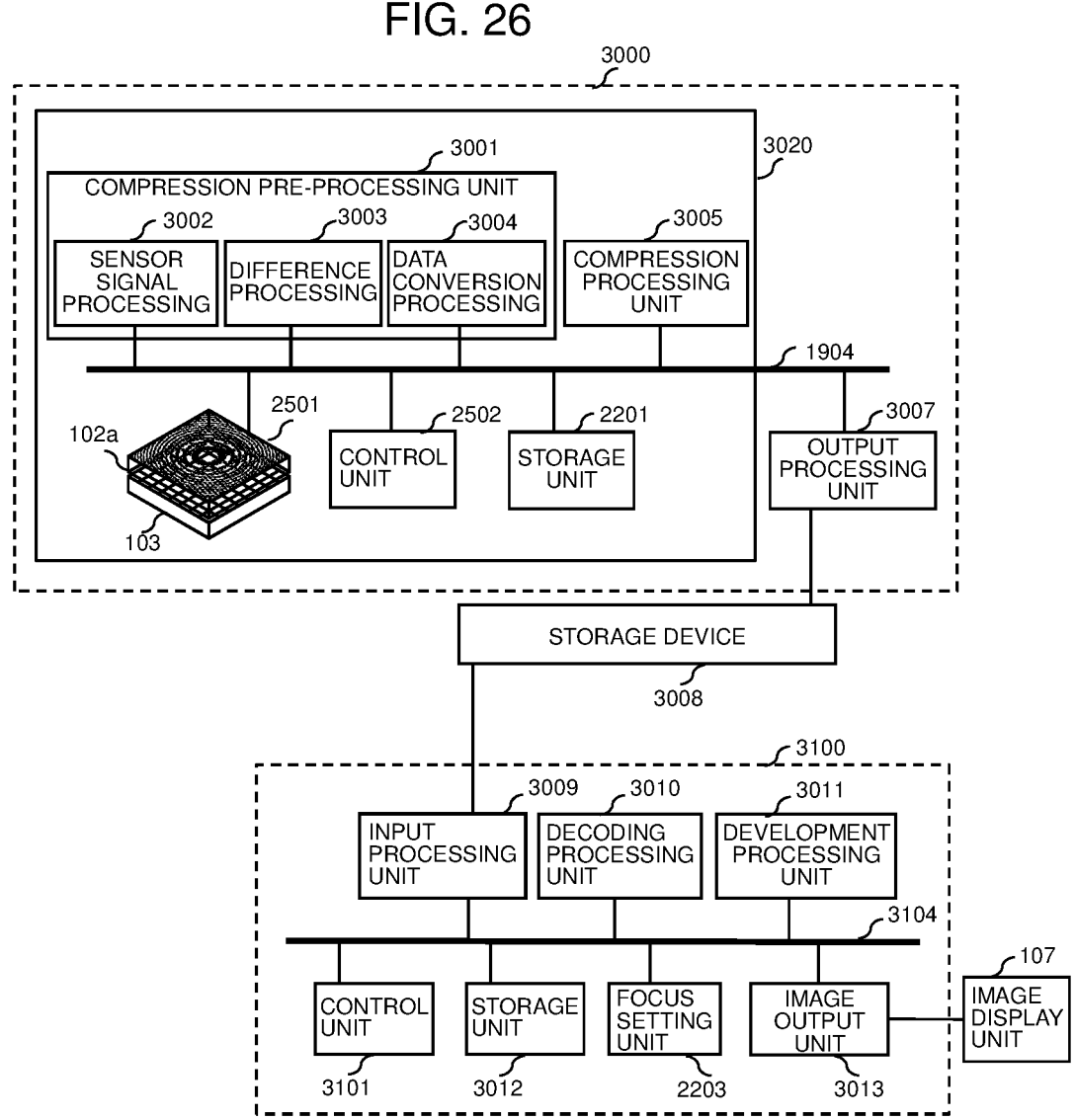
FIG. 26 is a view illustrating an example of compressing difference image data.

FIG. 26 illustrates a configuration example of an imaging system including an imaging device 3000 and a reproduction device 3100 which reduce a processing load of an imaging device by reducing the amount of information of an image for which focus adjustment can be performed after being captured, and dividing the processing in the image processing unit 2503 in FIG. 19. The same reference numeral will be given to the same portion as in FIG. 19, and description thereof will be omitted. The imaging system includes the imaging device 3000 and the reproduction device 3100 (restoring device). Note that, in the imaging system, an example in which the time-division fringe scanning is applied is illustrated.

The imaging device 3000 is a device that captures and image and compresses the result. In addition, the reproduction device 3100 is a device that restores the compressed result and reproduces the restored result. The imaging device 3000 includes an imaging unit 3020 and an output processing unit 3007, and these units are connected with a bus 1904.

The imaging unit 3020 includes the image sensor unit 103, the modulator 2501, the transparent grating substrate 102a, the control unit 2502, a compression pre-processing unit 3001, a compression processing unit 3005 (compression unit), and the storage unit 2201. The compression pre-processing unit 3001 includes a sensor signal processing unit 3002, a difference processing unit 3003, and a data conversion processing unit 3004 (data conversion unit).

The reproduction device 3100 includes a control unit 3101, an input processing unit 3009, a decoding processing unit 3010, a development processing unit 3011 (an image restoring processing unit, a modulation processing unit), a storage unit 3012, the focus setting unit 2203, and an image output unit 3013, and these units are connected to each other with a bus 3104.

In addition, in the imaging system, the image display unit 107 and a storage device 3008 are further provided.

The control unit 2502 collectively controls the image sensor unit 103, the modulator 2501, the compression pre-processing unit 3001, and the like.

For example, the sensor signal processing unit 3002 generates complementary data from each pixel data (image signal) output from the image sensor unit 103, performs demosaicing processing of generating RGB data corresponding to each pixel, and the like, and outputs the RGB data as a sensor image. With regard to the sensor image, in correspondence with necessity, image data is stored in the storage unit 2201, or transmitted to the difference processing unit 3003. In this manner, the sensor signal processing unit 3002 receives an image signal output from the image sensor unit 103.

For example, the sensor signal processing unit 3002 receives an image signal (first image signal) when the modulator 2501 is the first grating pattern, or receives an image signal (second image signal) when the modulator 2501 is the second grating pattern. In addition, the sensor signal processing unit 3002 receives an image signal (third image signal) when the modulator 2501 is the third grating pattern, or receives an image signal (fourth image signal) when the modulator 2501 is the fourth grating pattern.

The difference processing unit 3003 takes a difference between two sheets of sensor images (image signals) of a region imaged while changing the phase of the modulator 2501, and generates a difference image (difference data). In addition, the difference processing unit 3003 directly acquires the sensor image from the sensor signal processing unit 3002, or acquires the sensor image stored in the storage unit 2201. In addition, the difference processing unit 3003 stores the difference image in the storage unit 2201 as image data in correspondence with necessity. Note that, for example, in a case where the sensor image is a color image, and one pixel is constituted by R data, G data, and B data, a difference may be taken for each data of the R data, G data, and B data. In this manner, the difference processing unit 3003 calculates a difference of the image signals received by the sensor signal processing unit 3002, and generates a difference image based on the difference.

For example, the difference processing unit 3003 calculates a difference between the first image signal and the second image signal, and generates a difference image (first difference data) based on the difference. In addition, the difference processing unit 3003 calculates a difference between the third image signal and the fourth image signal, and generates a difference image (second difference data) based on the difference.

Here, description will be given of characteristics of input and output signals of the difference processing unit 3003 in the case of this imaging device. A graph showing an example of a partial brightness variation of a sensor image output from the sensor signal processing unit 3002 in FIG. 26 is shown in FIG. 27. The horizontal axis represents a horizontal position a screen in a certain line, and the vertical axis represents a pixel data value. Here, the larger the pixel data value, the brighter it is. Note that, in FIG. 27, a case where pixel data is expressed by 12 bits is exemplified, but the pixel data value may be expressed by another bit number, or a normalized data value.

FIG. 27($a$) shows an example of a pixel data variation of a screen region in the case of using the pattern in FIG. 24($a$) in the modulator 2501 in FIG. 26, and FIG. 27($b$) shows an example of the pixel data variation in the case of using the pattern in FIG. 24($c$) in the modulator 2501 in FIG. 26. A sensor image captured by this imaging device is different from a sensor image obtained by using a lens, and is an integrated value of the amount of light, and thus in a case where the image sensor ideally images a subject, a rapid data variation does not occur.

However, for example, a DC component of data may greatly vary due to a shadow of a casing and the like, or characteristics inside the image sensor. To exclude an effect thereof, only data portion of a necessary sensor image can be extracted by taking a difference between sensor images in which the phases of the modulator 2501 are different by $\pi$.

A graph showing an example of a partial brightness variation of a difference image output from the difference processing unit 3003 is shown in FIG. 28. In FIG. 28, the vertical axis represents a difference value, and the horizontal axis represents a position of each pixel. As shown in FIG. 28, a difference between pixel values of respective positions is illustrated, a value of a position where the difference is the largest becomes a maximum value of 3401, and a value of a position where the difference is the smallest becomes a minimum value of 3402. Example of FIG. 28 represents data at the same position as in the video of FIG. 27. A darkening influence by a shadow is excluded, and only information necessary for subsequently being a video in the reproduction device 3100.

Returning to FIG. 26, the data conversion processing unit 3004 obtains a minimum value and a maximum value of the pixel data difference value from the entirety of difference images obtained by the difference processing unit 3003. The minimum value is set as an offset value, and subtraction is performed from each pixel data difference value. According to this, the number of bits necessary for expressing the difference image becomes the number of bits necessary for expressing data obtained by subtracting the minimum value from the maximum value, and the number of bits expressing the original pixel value can be greatly reduced.

Note that, in the data conversion processing unit 3004, in a case where the number of bits per one pixel of an input image is determined in advance in the rear-stage compression processing unit 3005, or in consideration of compression efficiency, processing such as allocating the difference image obtained by offset subtraction to, for example, eight bits, and generates compression image data. In addition, in the compression processing unit 3005 at the rear stage, in a case where expression by luminance and a color instead of red, green, and blue data is obtained as the input image, conversion is performed in combination.

In this manner, the data conversion processing unit 3004 generates a difference range (a maximum value and a minimum value) of the image signal which is obtained by the difference processing unit 3003, and compression image data (first compression image data) based on the difference data. Note that, description has been given of a case where the maximum value and the minimum value are calculated, but the data conversion processing unit 3004 may calculate information other than information indicating the difference range.

The data conversion processing unit 3004 transmits the generated compression image data to the compression processing unit 3005. In addition, in a case where the difference processing unit 3003 calculates a difference between the third image signal and the fourth image signal, and generates a difference image (second difference data) based on the difference, the data conversion processing unit 3004 generates a compression image (second compression image data) based on the difference.

The compression processing unit 3005 performs compression processing of reducing data amount of a still image, a moving image, and an audio in a case where an audio input is present (not illustrated). Examples of a compression encoding method include JPEG, JPEG2000, MPEG2, H.264/AVC, and H.265/HEVC. The compression processing unit 3005 acquires the compression image from the data conversion processing unit 3004, compresses the compression image, and generate compression data including compressed data. A compression data structure by the compression processing unit 3005 is composed of, a header, compression image data, a footer, for example, in JPEG.

FIG. 29 illustrates a compression data configuration example of one compression image. As illustrated in FIG. 29, the compression data includes a header portion 3501, compression image data 3502, and a footer portion 3503. The header portion 3501 stores information necessary for compression and decoding of an image such as an initiation marker, a file size, an image size, and quantization table.

The compression image data 3502 is data obtained by compressing the compression image. The footer portion 3503 is a portion that stores a termination marker and the like. Note that, the header portion 3501 includes a region 3504 capable of freely setting data for every application in the header. The compression processing unit 3005 adds metadata to the region 3504.

Here, FIG. 30 illustrates an example of the metadata that is added by the compression processing unit 3005. As illustrated in FIG. 30, the metadata includes a record 3601 and a record 3602. The record 3601 includes a variable and a value of the minimum value, which is obtained by the data conversion processing unit 3004, of the pixel data of the difference image. The record 3602 includes a variable and a value of the maximum value of the pixel data of the difference image.

Returning to FIG. 26, at the time of image compression, the compression processing unit 3005 generates a compression image and a compression parameter, and adds information illustrated in FIG. 30 as the metadata, thereby enabling image restoration in the reproduction device 3100 at a rear stage to be performed. In this manner, the compression processing unit 3005 includes information (the variable and the value of the minimum value and the variable and the value of the maximum value) indicating the range of the difference into the compression image.

Note that, addition of the metadata may be performed at the time of outputting from the imaging device 3000, and thus the metadata may be reattached to the header to which the metadata is added by the output processing unit 3007.

In a case where the difference processing unit 3003 calculates a difference between the third image signal and the fourth image signal, and generates a difference image based on the difference, the compression processing unit 3005 includes information (the variable and the value of the minimum value and the variable and the value of the maximum value) indicating the range of the difference between the third image signal and the fourth image signal into the compression image obtained by compressing the second compression image data.

The output processing unit 3007 is a portion that outputs the compression data generated by the compression processing unit 3005. The output processing unit 3007 outputs the compression data to the storage device 3008 to be stored.

The storage unit 2201 and the storage unit 3012 are used by the compression pre-processing unit 3001, the compression processing unit 3005, the decoding processing unit 3010, and the development processing unit 3011 to temporarily store parameters or to store the image data.

The output processing unit 3007 records a compression file generated by the compression processing unit 3005 in the storage device 3008.

The storage device 3008 is a device that records digital data such as a hard disk drive (HDD), a solid state drive (SSD), a memory card, and a recorder that uses the device.

For example, the control unit 3101 collectively controls the input processing unit 3009, the decoding processing unit 3010, the development processing unit 3011, the focus setting unit 2203, and the like.

The input processing unit 3009 sequentially takes out the compression data stored in the storage device 3008 or in response to user request (not illustrated). In this manner, the input processing unit 3009 input data output by the output processing unit 3007. The input processing unit 3009 transmits the input data to the decoding processing unit 3010.

The decoding processing unit 3010 performs decoding processing in the method used in the compression method of the compression processing unit 3005 to decode the compression image data 3502 from the information stored in the header portion 3501 in FIG. 29, thereby acquiring a decoded image (compression restored image). In addition, the decoding processing unit 3010 simultaneously acquires the metadata that is added, and transmits the metadata to the development processing unit 3011.

The development processing unit 3011 generates a restored difference image by restoring an image (difference data) with an offset and an original bit depth from the decoded image and the metadata. That is, the development processing unit 3011 generates the restored difference image from the decoded image and the range of the difference.

The development processing unit 3011 further performs the rear surface pitch determination (S2301) and the rear surface grating intensity modulation (S2101) described in FIG. 18 for focus adjustment, and performs the intensity modulation result addition (S2703) described in FIG. 22. In addition, the development processing unit 3011 sequentially performs the two-dimensional FFT operation (S501), the spectrum cutting (S502), the intensity calculation (S503), the noise removal (S504), the contrast emphasis (S505), the color balance adjustment (S506), and the output signal generation processing (S507) described in FIG. 3, and generates a display signal so that the image display unit 107 can display a developed image.

That is, the development processing unit 3011 modulates the restored difference image to generate a moire fringe image, and Fourier-transforms the moire fringe image to calculate a frequency spectrum.

When the imaging device is set to have the above-described configuration, it is possible to reduce a data amount of an image for which focus adjustment or the like can be subsequently performed, and this leads to a cost reduction in the storage device. In addition, when the development processing is performed by the reproduction device, processing by the storage device is reduced, and this realizes reduction in size and reduction in cost of the storage device. Note that, as long as the configuration illustrated in the drawings, the reproduction device can be realized by software processing by using a PC or the like, or processing may be performed by hardware such as a GPU and FPGA. In addition, the storage device may be an HDD that is embedded in the reproduction device.

Figure 31:
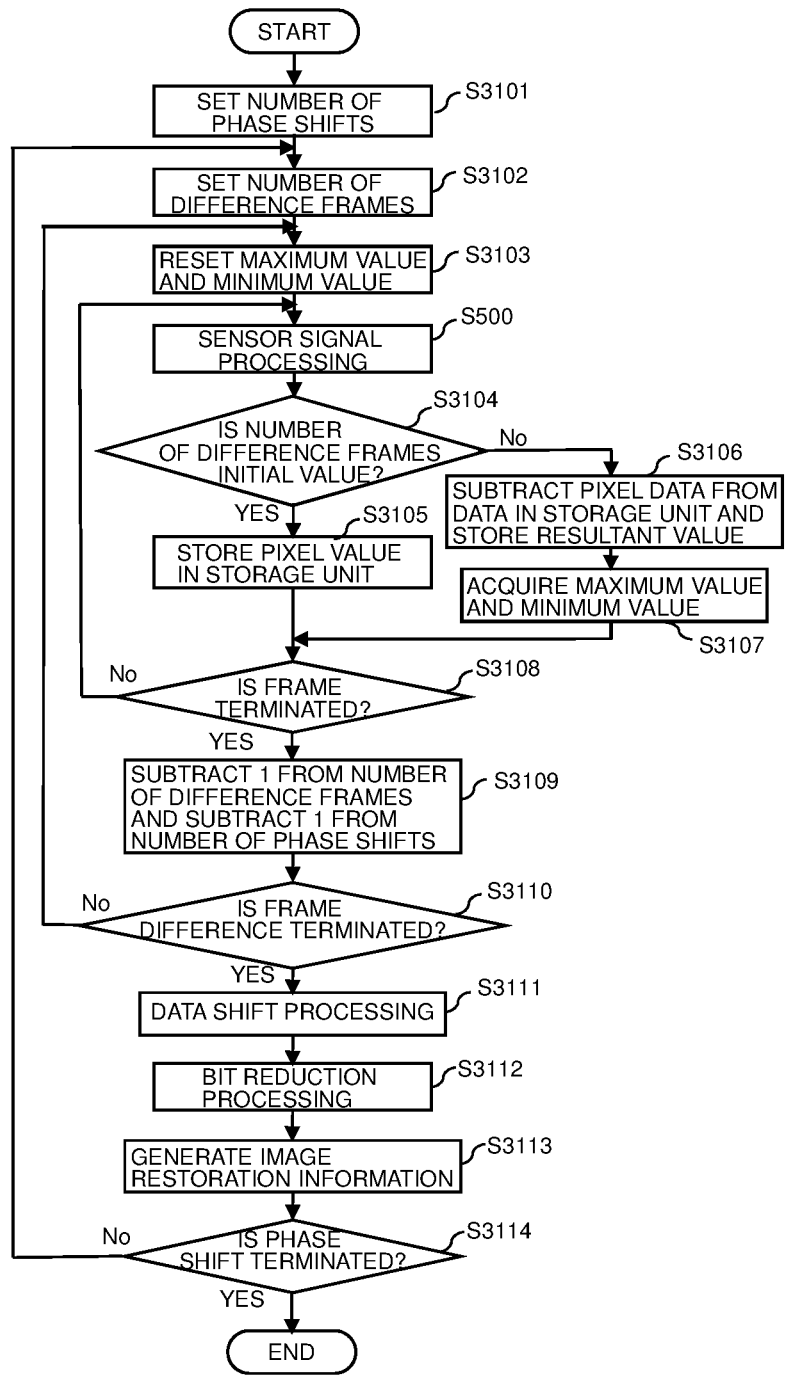
FIG. 31 is a view illustrating a processing flow of a compression pre-processing unit in the example of compressing the difference image data.

A flowchart illustrating an outline of the image processing in the compression pre-processing unit 3001 is illustrated in FIG. 31. First, the compression pre-processing unit 3001 sets the number of phase shifts of the grating pattern (zone plate) of the modulator 2501 (S3101). For example, the compression pre-processing unit 3001 sets "4" in the case of four-pattern time division. Note that, the number of the phase shifts may be set in advance in the compression pre-processing unit 3001.

Net, the compression pre-processing unit 3001 sets the number of frames for taking a difference of image data (S3102). In addition, the compression pre-processing unit 3001 sets a maximum value and a minimum value to reset, for example, 0 (S3103).

The compression pre-processing unit 3001 executes sensor signal processing (S500), and in a case where it is determined that a difference frame is an initial value (S3104: Yes), the compression pre-processing unit 3001 stores pixel data in the storage unit 2201 (S3105). The processing of the sensor signal processing S500 is repeated until it is determined as frame termination in step S3108.

In a case where it is determined in step S3104 that it is not the initial frame, in step S3106, the pixel value of the same coordinates as stored in step S3105 is subtracted, and the resultant value is stored in the storage unit 2201. In addition, in step S3107, the maximum value and the minimum value, and the pixel value are compared with each other. In a case where the pixel value is greater than the maximum value, the pixel value is set to the maximum value, and in a case where the pixel value is smaller than the minimum value, the pixel value is set to the minimum value. Next, determination of the frame termination in step S3018 is performed, and in a case where it is determined that the frame is not terminated, sensor signal processing is executed (S500), and in the case of frame termination, the processing is terminated.

In step S3109, "1" is subtracted from the number of frames and the phase shifts for acquiring the difference. In step S3110, in a case where it is not determined as frame difference termination, the processing returns to the maximum value and the minimum value reset processing in step S3103. In a case where the frame difference processing is terminated, data shift processing in step S3111 is performed.

In step S3111, data shift processing of setting the minimum value of the difference image value to 0 by processing of subtracting the minimum value from the minimum value acquired in step S3107, for example, all difference pixel values. In step S3112, bit reduction processing of reducing, for example, an upper layer bit that is not used from the maximum value acquired in step S3107 is performed.

Note that, in the bit reduction processing (S3112), processing of allocation to the number of bits as a target is performed in a case where the number of bits of the image data is limited by an algorithm that is used in image compression, or the like. In step S3113, image restoration information, for example, information of the maximum value and the minimum value is generated as metadata so that the difference pixel value converted in the data shift processing (S3111) and the bit reduction processing (S3112) can be restored in the subsequent development processing.

Next, in step S3114, determination is made as to whether or not phase shift is terminated. In a case where all kinds of phase processing are terminated, the processing is terminated. In a case where all kinds of phase processing are not terminated, processing from step S3102 is repeated.

Due to the above-described compression pre-processing, the number of bits of the pixel value of the sensor image can be reduced, and efficient compression can be performed.

Figure 32:
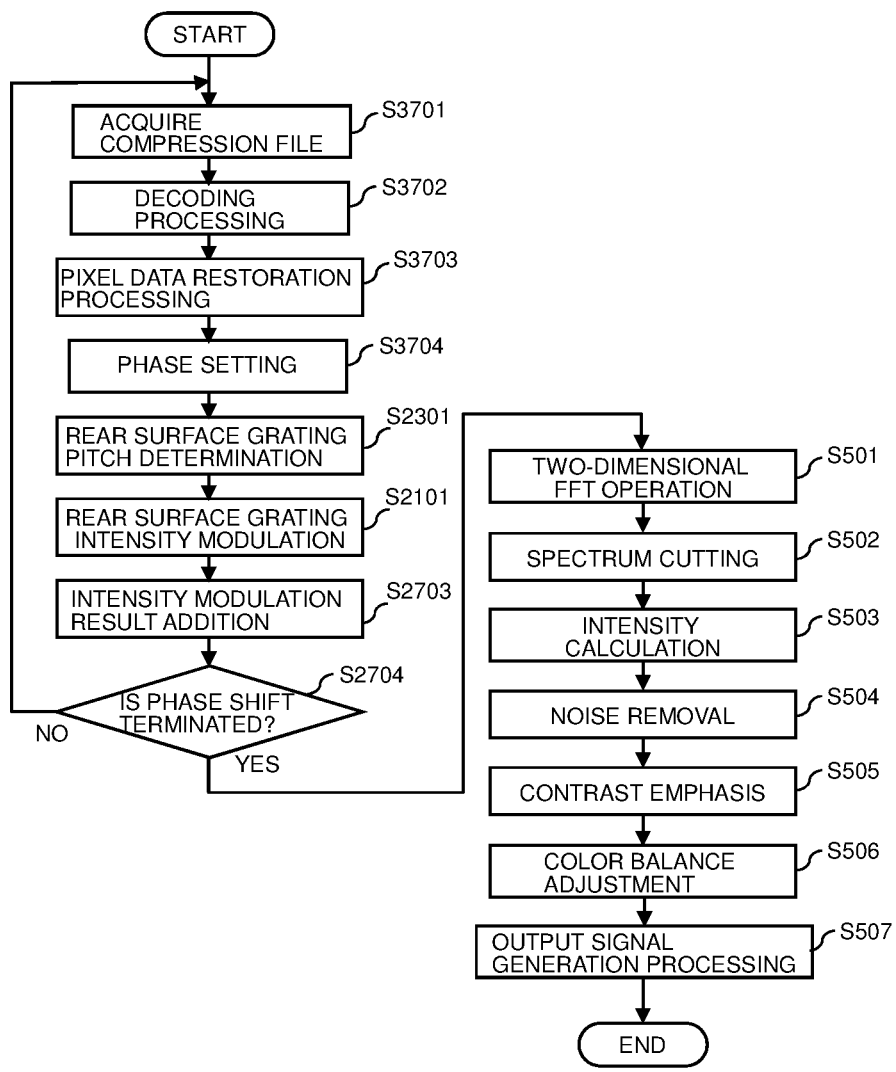
FIG. 32 is a view illustrating a processing flow of an image reproduction unit in an example of compressing the capacity of the difference image data.

Next, a processing procedure of the reproduction device 3100 illustrated in FIG. 26 will be described with reference to FIG. 32. In FIG. 32, the same reference numeral will be given to the same processing in FIG. 3, FIG. 16, FIG. 18, and FIG. 22, and description thereof will be omitted. In FIG. 32, when processing is initiated, in step S3701, a compression file is acquired from the storage unit 3012. Next, in step S3702, decoding processing of the compression image is performed by using header information of the compression file. Next, in step S3703, pixel data restoration processing of acquiring image information that is the maximum value and the minimum value of the pixel data of the original image from the metadata located in the header of the compression file, and restoring the pixel data of the difference image before being processed by the data conversion processing unit 3004 in FIG. 26.

Here, in a case where an algorithm used in compression is irreversible compression, a restored image may not be completely the same. Next, in step S3704, a phase of the modulator is set. With regard to the phase, for example, it is assumed that a first setting value of the phase is 0, and a difference deviates by π.

Hereinafter, the rear surface pitch determination (S2301) and the rear surface grating intensity modulation (S2101) described in FIG. 18 are performed, and the intensity modulation result addition (S2703) described in FIG. 22 is performed. Here, in step S2704, it is determined whether or not phase shift is terminated. For example, in a case where processing of the phase shift π is not terminated, the process returns to the compression file acquisition (S3701). In a case where the phase shift is terminated, the two-dimensional FFT operation (S501), the spectrum cutting (S502), the intensity calculation (S503), the noise removal (S504), the contrast emphasis (S505), the color balance adjustment (S506), and the output signal generation processing (S507) described in FIG. 3 are sequentially performed, and a display signal is generated so that the image display unit 107 can display a developed image.

In the above-described reproduction device, the compressed image is decoded, and a focus adjustable image is restored. According to this, in the reproduction device, subject focus adjustment or distance measurement can be performed when a user desires.

Figure 33:
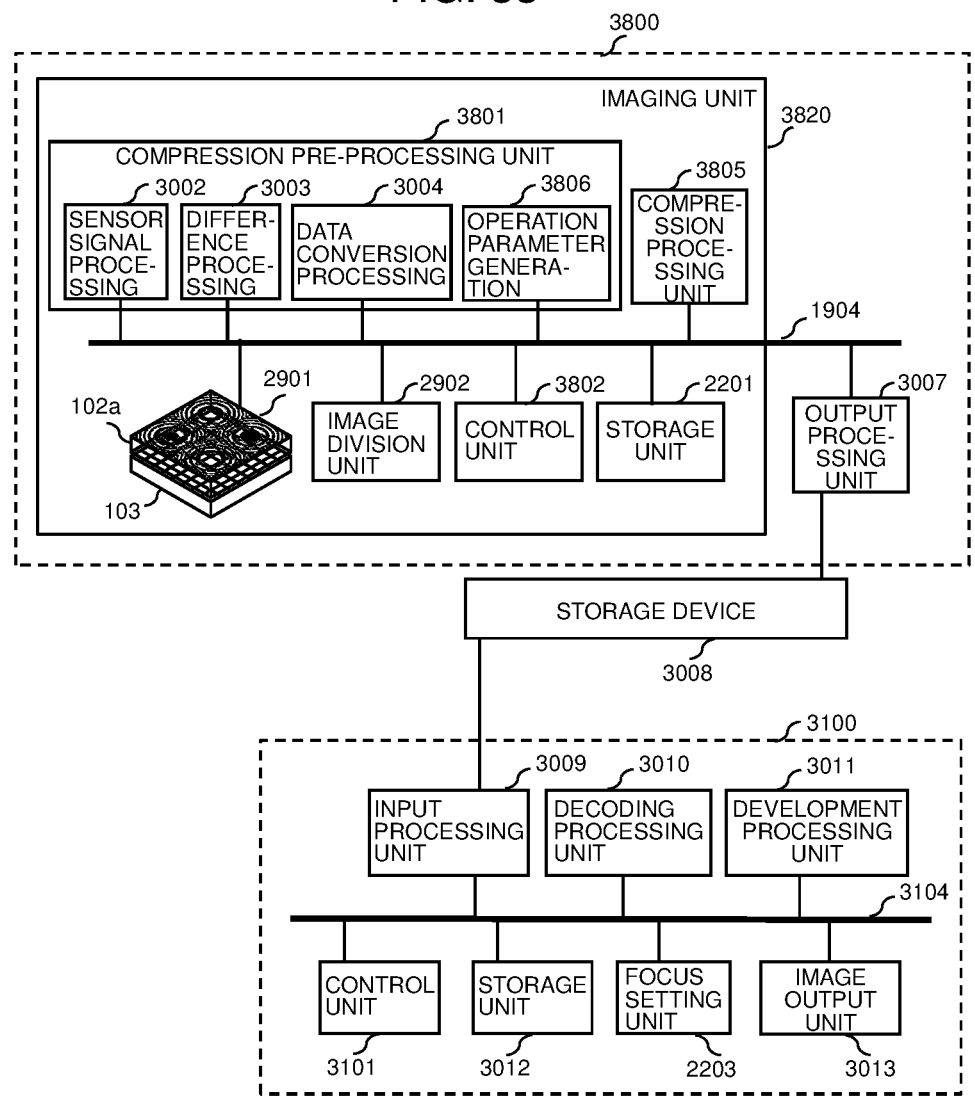
FIG. 33 is a configuration diagram of an imaging system in Example 1.

FIG. 33 illustrates a configuration diagram of an imaging system in this example. FIG. 33 is a configuration example of the imaging system including a lensless imaging device 3800 and the reproduction device 3100 (restoring device) which are suitable for continuous moving image capturing by reducing the amount of information of an image for which focus adjustment can be performed after image capturing in a moving image, and by performing control for each of a plurality of frames with respect to the processing of the image processing unit 2503 in FIG. 23. In FIG. 33, the same reference numeral will be given to the same component as in FIG. 26 and FIG. 23, and description thereof will be omitted. Note that, in the imaging system, description will be given of an example of applying space-division fringe scanning capable of simultaneously capturing images corresponding to one frame for moving image processing.

In FIG. 33, the lensless imaging device 3800 is a device that compresses an image capturing result. In addition, the reproduction device 3100 is a device that restores the compressed result, and reproduces the restored result.

The imaging device 3800 includes an imaging unit 3820 and an output processing unit 3007. The imaging unit 3820 includes the image sensor unit 103, the transparent grating substrate 102a, the transparent grating substrate 102a, the modulator 2901, a control unit 3802, a compression pre-processing unit 3801, a compression processing unit 3805 (compression unit), and the storage unit 2201. The compression pre-processing unit 3801 includes a sensor signal processing unit 3002, a difference processing unit 3003, a data conversion processing unit 3804 (data conversion unit), an operation parameter generation unit 3806.

The control unit 3802 collectively controls the image sensor unit 103, the compression pre-processing unit 3801, the compression processing unit 3805, and the like.

Figure 34:
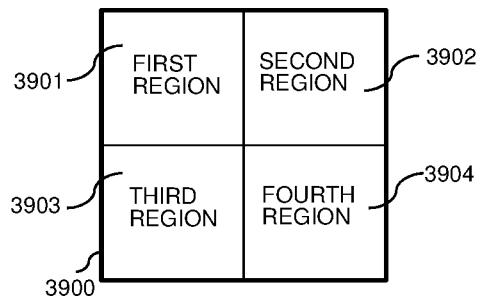
FIG. 34 is a view illustrating a screen division example in Example 1.

For example, the image division unit 2902 divides each pixel data (image signal) output from the image sensor unit 103 into four regions for every phase pattern of the modulator 2901. FIG. 34 illustrates an image signal division example. A reference numeral 3900 indicates the entirety of an image signal, a reference numeral 3901 indicates a region (first region) of the image signal in a first grating pattern region, a reference numeral 3092 indicates a region (second region) of the image signal of a second grating pattern region, a reference numeral 3093 indicates a region (third region) of the image signal of a third grating pattern region, and a reference numeral 3094 indicates a region (fourth region) of the image signal of a fourth grating pattern region. After the image division unit 2902, the image signals of the first region, the second region, the third region, and the fourth region are handled as individual images.

Returning to FIG. 33, for example, the sensor signal processing unit 3002 generates complementary data for every region divided by the image division unit 2902, performs demosaicing processing of generating RGB data corresponding to each pixel, and the like, and outputs the RGB data as a sensor image. With regard to the sensor image, in correspondence with necessity, image data is stored in the storage unit 2201, or transmitted to the difference processing unit 3003. In this manner, the sensor signal processing unit 3002 receives an image signal output from the image sensor unit 103.

For example, the sensor signal processing unit 3002 receives the image signal of the first grating pattern region of the modulator 2901 as a first image signal, receives the image signal of the second grating pattern region as a second image signal, receives the image signal of the third grating pattern region as a third image signal, or receives the image signal of the fourth grating pattern region as a fourth image signal.

As described in FIG. 26, the difference processing unit 3003 calculates a difference between the first image signal and the second image signal, and generates a difference image (first difference data) based on the difference. In addition, the difference processing unit 3003 calculates a difference between the third image signal and the fourth image signal, and generates a difference image (second difference data) based on the difference.

The operation parameter generation unit 3806 obtains a minimum value and a maximum value of each pixel data of the difference image obtained by the difference processing unit 3003 on the basis of an instruction of the control unit 3802 to be described later, generates operation parameters for conversion into an image before compression from the difference image by the data conversion processing unit 3804 on the basis of the maximum value and the minimum value which are obtained, and stores the operation parameters in the storage unit. For example, when a value taken by each pixel of the image before compression is set to 8 bits, with regard to the operation parameters, a minimum value is set as an offset value for bit shift operation, and a value obtained by dividing a maximum amplitude value that is a difference between the maximum value and the minimum value by 255 is set as a multiplication coefficient for bit reduction processing. Here, in the case of continuous moving image, when generating and applying an operation parameter different for one sheet of image, compression efficiency at the rear-stage compression processing unit 3805 may deteriorate, or flicker in a final video may be caused to occur.

Figure 35:
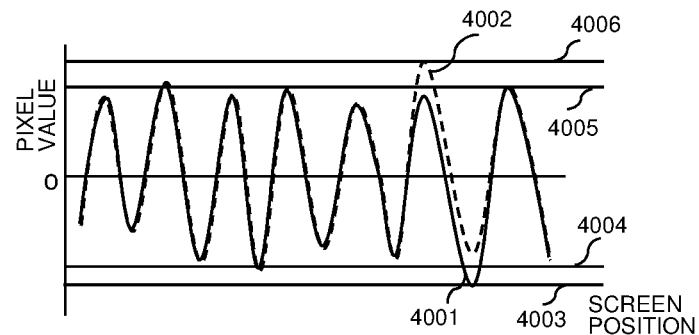
FIG. 35 is a view showing an example of a signal that is input to data conversion processing unit in Example 1.

FIG. 35 shows a signal example that is input to the data conversion processing unit 3804. The horizontal axis represents a position of an image, and the vertical axis represents a pixel value. A reference numeral 4001 indicates a part of a certain frame signal example, and a reference numeral 4002 indicates a part of a frame signal example different from the frame signal example 4001. A reference numeral 4003 indicates a minimum value of the frame signal example 4001, a reference numeral 4004 indicates a minimum value of the frame signal example 4002, a reference numeral 4005 indicates a maximum value of the frame signal example 4001, and a reference numeral 4006 indicates a maximum value of the frame signal example 4002. As shown in FIG. 35, the maximum value and the minimum value vary for every frame. Here, for example, operation parameters are generated by acquiring the maximum value and the minimum value of a key frame that is a key image, and a certain constant period is set to the same offset. For example, the key frame is a frame to be compressed regardless of image data of different frames such as previous and subsequent frames, and is generated once every several to several hundred frames by the compression processing unit 3805. For example, the certain period is a period from the key frame to the next key frame. Note that, there is a possibility that image quality deterioration may occur in a difference image that deviates from the minimum value and the maximum value of the difference image of the key frame, but the influence is not great. In addition, operation parameters using values, which are obtained by adding or subtracting a fluctuation prediction value of each frame to or from the maximum value and the minimum value of the key frame, may be generated and set.

In the data conversion processing unit 3804, in a case where the number of bits per one pixel of an input image is determined in advance in the rear-stage compression processing unit 3805, or in consideration of compression efficiency, processing of allocating the difference image obtained by offset subtraction to, for example, eight bits, or like is performed, and compression image data is generated. In addition, in the compression processing unit 3805 at the rear stage, in a case where expression by luminance and a color instead of red, green, and blue data is obtained as the input image, conversion is performed in combination.

As in the compression processing unit 3005 in FIG. 26, the compression processing unit 3805 performs compression processing of reducing data amount of a still image, a moving image, and an audio in a case where an audio input is present (not illustrated).

For example, in a case where the modulator 2901 has four phases, the compression processing unit 3805 compresses a moving image in a compression method that realizes a high compression rate by using correlation between images of a plurality of frames, and the imaging device 3800 compresses and outputs, for example, the difference image of the first difference data and the difference image of the second difference data, the compression processing unit 3805 includes two-system inputs and two-system outputs for the difference image of the first difference image data and the difference image of the second difference image data so as to compress respective continuous difference images.

Figure 36:
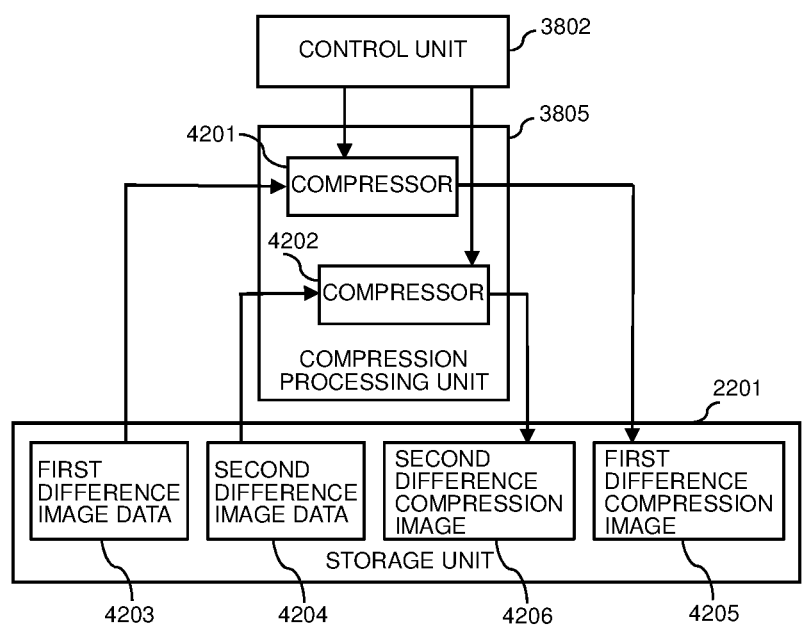
FIG. 36 is a view illustrating a configuration example of a compression processing unit in Example 1.

FIG. 36 illustrates a configuration example of the compression processing unit 3805. The same reference numeral will be given to the same component as in FIG. 33, and description thereof will be omitted. A reference numeral 4201 indicates a first compressor, reference numeral 4202 indicates a second compressor, and the compression processing unit 3805 includes the compressors 4201 and the 4202. A reference numeral 4203 indicates first difference image data that is stored in the storage unit 2201 by the data conversion processing unit 3804, a reference numeral 4204 indicates second difference image data that is stored in the storage unit 2201 by the data conversion processing unit 3804, a reference numeral 4205 indicates first difference compression image that is stored in the storage unit 2201 by the compressor 4201, and a reference numeral 4206 indicates second difference image data that is stored in the storage unit 2201 by the compressor 4202. As illustrated in FIG. 36, the first difference image data for a difference image and the second difference image data are individually compressed to make continuous images related, and compression rate can be raised.

Note that, in a case where the modulator 2901 has two phases, a difference image becomes one sheet, and the compression processing unit 3805 may be one-system input and output.

The imaging device 3800 sequentially outputs data compressed by the compression processing unit 3805 from the output processing unit 3007.

As described above, when using the same offset value in a frame continuous from the key frame, a high compression effect is obtained during compression without losing the correlation of continuous images, and it is possible to prevent flicker due to fluctuations in luminance of images.

Figure 37:
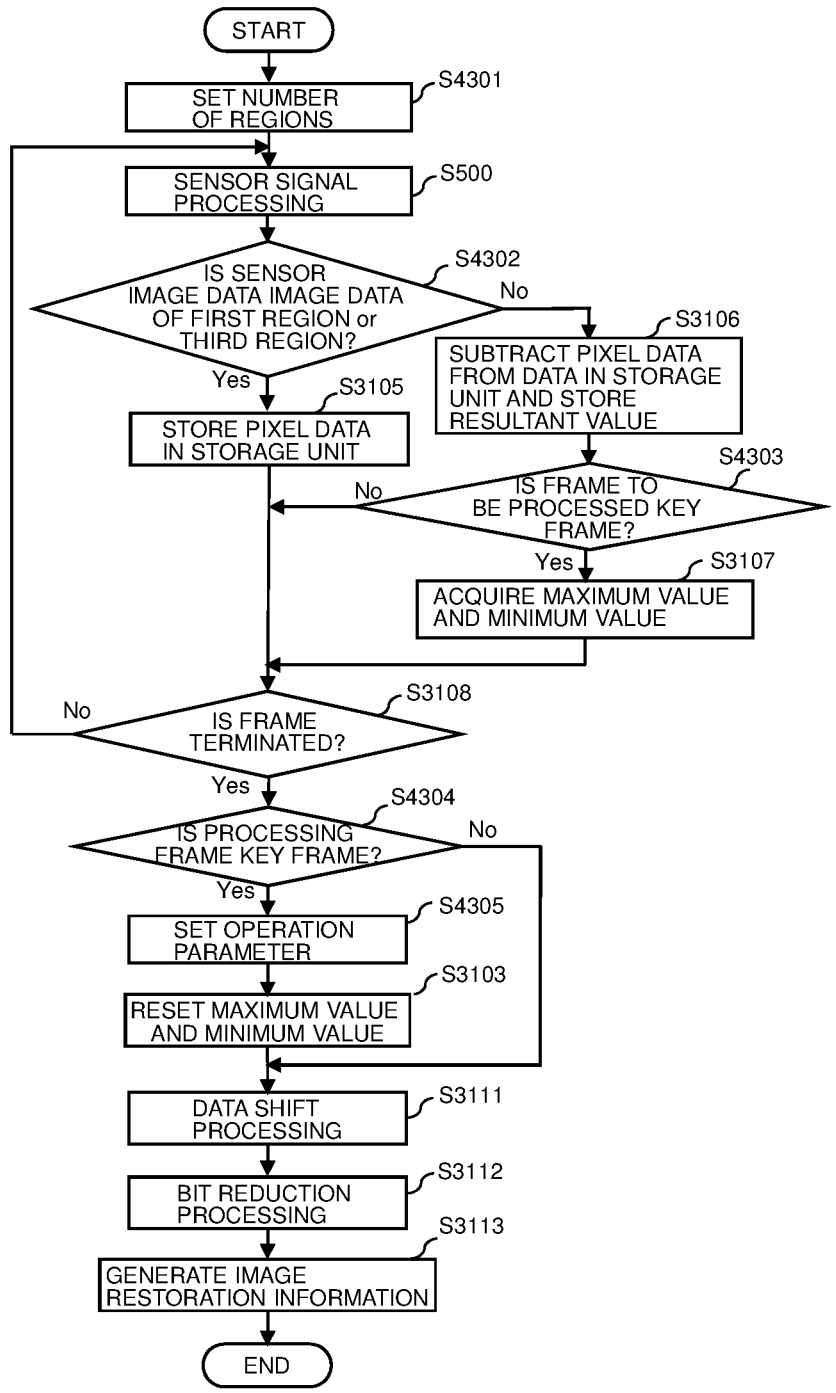
FIG. 37 is a view illustrating a processing flow in Example 1.

A flowchart illustrating a schematic example of image processing corresponding to one frame in the compression pre-processing unit 3801 is illustrated in FIG. 37. The same reference numeral will be given to the same processing as in FIG. 31, and description thereof will be omitted. First, the compression pre-processing unit 3801 sets the number of regions that is the number of grating patterns (zone plate) of the modulator 2901 (S4301). For example, the compression pre-processing unit 3801 sets "4" in the case of space division into four patterns. Note that, the number of regions may be set in advance in the compression pre-processing unit 3801. Next, the compression pre-processing unit 3801 executes sensor signal processing (S500).

Next, the compression pre-processing unit 3801 performs region determination processing. In a case where it is determined that the sensor image data is image data of the first region or the third region (S4302: Yes), and stores pixel data in the storage unit 2201 (S3105).

In step S4302, in a case where it is determined that the sensor image data is not the image data of the first region or the image data of the third region, in step S3106, subtraction of pixel values of the same coordinates which are stored in step S3105 is performed, and the result is stored in the storage unit 2201. In addition, in step S3107, the maximum value and the minimum value, and the pixel value are compared with each other. In a case where the pixel value is greater than the maximum value, the pixel value is set to the maximum value, and in a case where the pixel value is smaller than the minimum value, the pixel value is set to the minimum value. Next, determination of the frame termination in step S3108 is performed, and in a case where it is determined that the frame is not terminated, sensor signal processing is executed (S500).

In the case of frame termination, it is determined whether or not to set the operation parameters, for example, in accordance with whether or not the frame is the key frame. For example, in a case where a frame to be processed is the key frame (S4303: Yes), the maximum value and the minimum value are acquired in step S3107, and frame processing determination 3108 is performed. In step S4303, in a case where it is determined the frame is not the key frame, in step S3108, determination of the frame termination is performed.

In step S3108, region determination processing is repeated until it is determined as frame termination. In a case where it is determined as frame termination in step S3108, and it is determined as the processing frame is the key frame (S4304: Yes), setting of parameters for generating image data to be compressed from information of the minimum value and the maximum value (S4305), and reset (S3103) of the minimum value and the maximum value is performed. For example, the key frame is a frame to be compressed regardless of image data of other frames such as previous and subsequent frames, and is generated once every several to several hundred frames by the compression processing unit 3805. Note that, a processing flow corresponding to one frame is described here, but reset of the maximum value and the minimum value is performed at the time of initiation of all kinds of processing. Subsequent steps S3111 to S3113 are the same as in FIG. 31, and thus description thereof will be omitted.

As described above, due to the compression pre-processing of reducing the capacity of a plurality of continuous frames by using the maximum value and the minimum value of the key frame, compression can be performed efficiently.

Note that, in this example, description has been given of an example in which a frame from which the maximum value and the minimum value are acquired is set as the key frame, but a maximum value and a minimum value acquired from another frame may be used.

As described above, according to this example, the modulator includes a first grating pattern and a second grating pattern having a phase deviating from a phase of the first grating pattern, the sensor signal processing unit receives a first image signal output by the first grating pattern and a second image signal output by the second grating pattern, the difference processing unit calculates a difference between the first image signal and the second image signal, and the compression processing unit includes information indicating a range of the difference into first compression image data. According to this, it is possible to reduce a data amount of an image for which focus adjustment and the like can be subsequently performed, and this leads to a cost reduction in the storage device. That is, it is possible to provide an imaging device, an imaging system, and an imaging method capable of managing an image captured by a lensless imaging device in a state in which the capacity is reduced.

Example 2

In this example, description will be given of processing of performing parameter setting for generating image data to be compressed from information of a minimum value and a maximum value of a plurality of frames.

Figure 38:
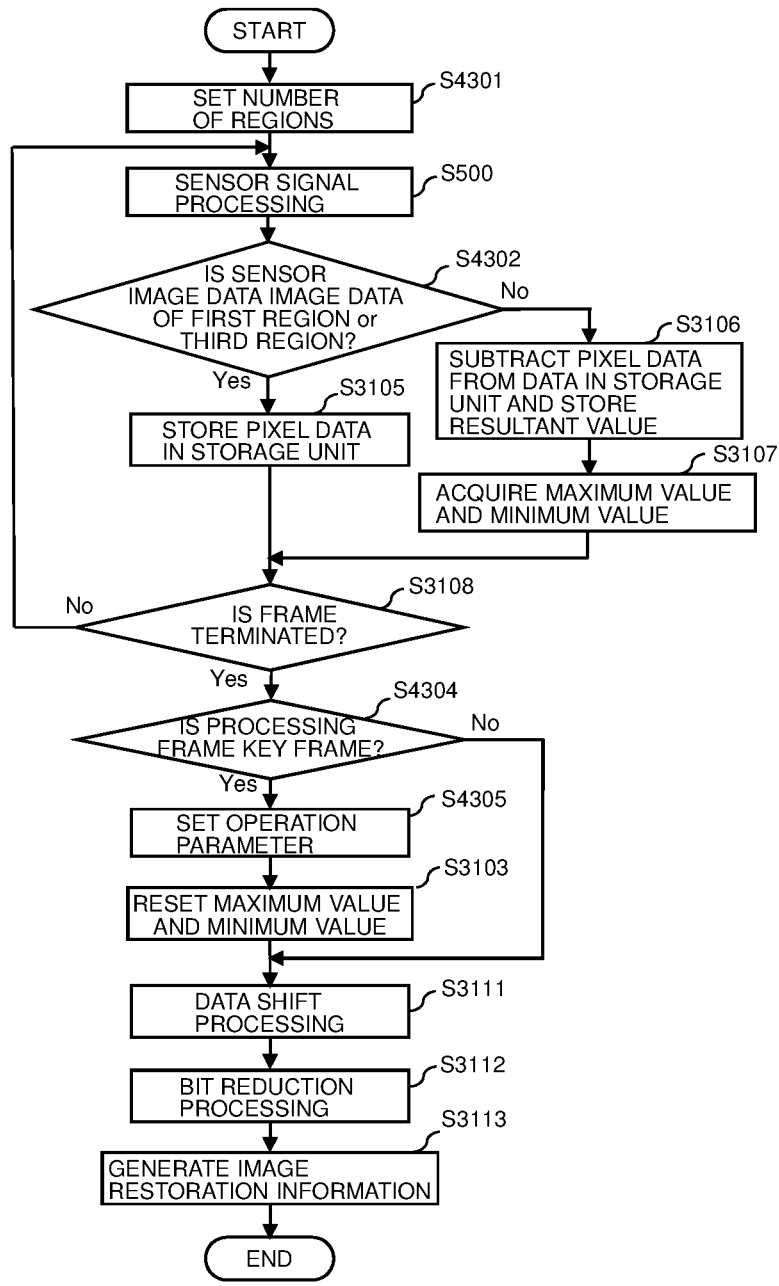
FIG. 38 is a view illustrating a processing flow in Example 2.

FIG. 38 is a processing flow of compressing a difference image data in this example, and illustrates a flowchart of image processing corresponding to one frame in the compression pre-processing unit 3801. In FIG. 38, the same reference numeral will be given to the same processing as in FIG. 37, and description thereof will be omitted. A difference from FIG. 37 is in that the key frame determination in step S4303 is not present.

That is, in FIG. 38, in step S3802, in a case where it is determined that image data is not the image data of the first region or image data of the third region, in step S3106, the pixel value of the same coordinates as stored in step S3105 is subtracted, and the resultant value is stored in the storage unit 2201. In addition, the key frame determination is not performed, and in step S3107, the maximum value and the minimum value, and the pixel value are compared with each other. In a case where the pixel value is greater than the maximum value, the pixel value is set to the maximum value, and in a case where the pixel value is smaller than the minimum value, the pixel value is set to the minimum value.

According to this, according to this example, as in Example 1, due to the compression pre-processing, it is possible to reduce the number of bits of the pixel value of the sensor image, and it is possible to efficiently perform compression. In addition, the maximum value and the minimum value of a plurality of frames are acquired, and thus this configuration is effective for a case where brightness varies for every frame in the difference image.

Example 3

In this example, description will be given of an example in which parameters for generating image data before compression are set with difference image data of image data obtained by dividing regions of image data output from the image sensor unit.

Figure 39:
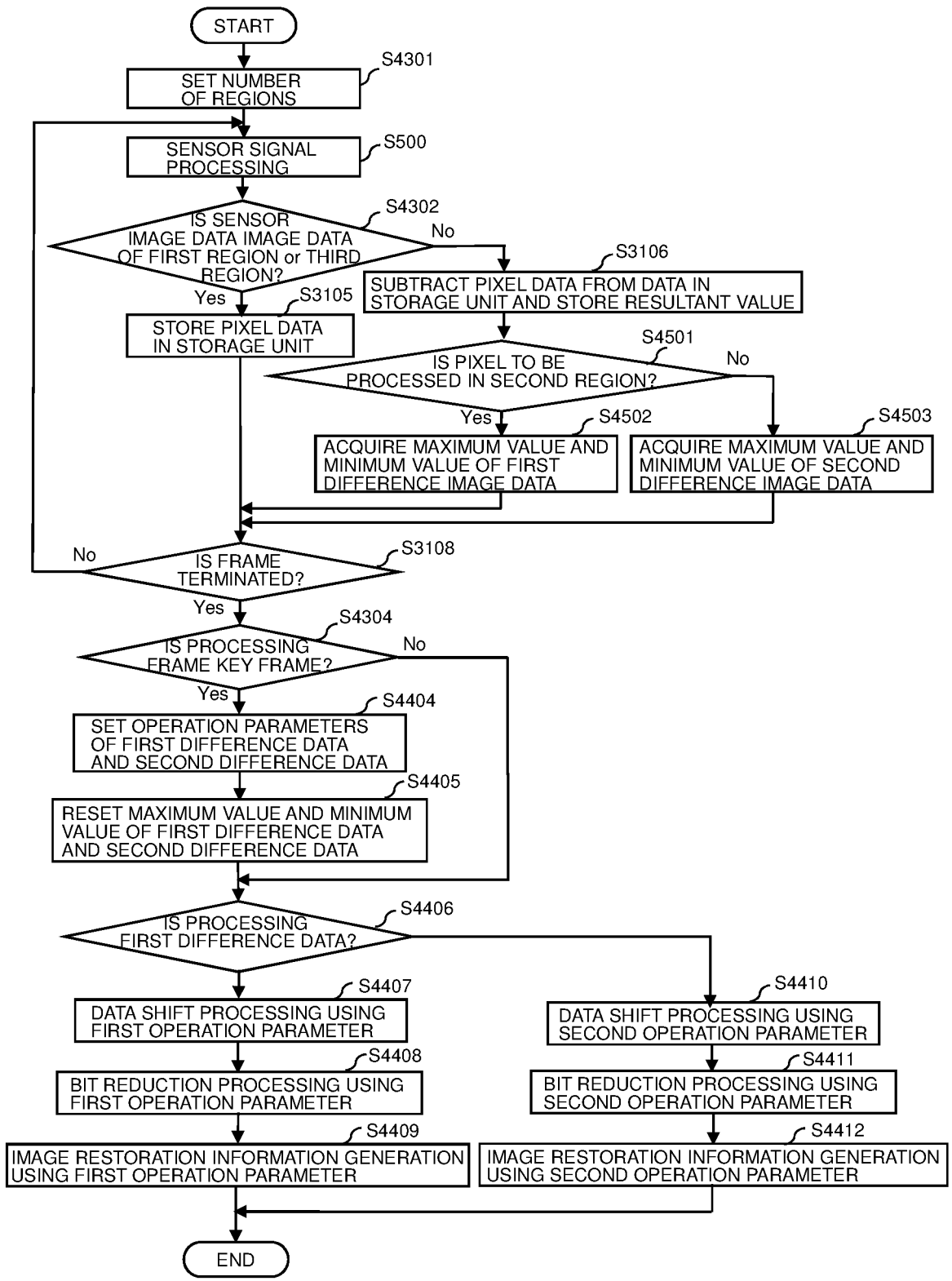
FIG. 39 is a view illustrating a processing flow in Example 3.

FIG. 39 is a processing flow of compressing the difference image data in this example, and illustrates a flowchart of image processing corresponding to one frame in the compression pre-processing unit 3801. In FIG. 39, for example, the parameters for generating image data before compression are respectively set with the difference image data of the first region 3901 and the third region 3903, and the difference image data of the second region 3902 and the fourth region 3904 in FIG. 34.

In FIG. 39, the same reference numeral will be given to the same processing as in FIG. 37, and description thereof will be omitted. A difference from FIG. 37 is in that processing from step S4501 to step S4503, and processing from S4404 to S4412 are provided.

That is, in FIG. 39, in step S3106, subtraction of pixel values of the same coordinates which are stored in step S3105 is performed, and the result is stored in the storage unit 2201. Then, in a case where a pixel to be processed exists in the second region (S4501: Yes), the pixel value is compared with the maximum value and the minimum value of the first pixel difference data which are retained. When a pixel value of the difference image data during processing is smaller than the minimum value, the pixel value is retained as the minimum value, and when the pixel value is larger than the maximum value, the pixel value is retained as the maximum value. Then, the frame termination determination processing in step S3108 is performed. In addition, in a case where a pixel to be processed exists in the fourth region (S4501: No), the pixel value is compared with the maximum value and the minimum value of the second pixel difference data which are retained. When a pixel value of the difference image data during processing is smaller than the minimum value, the pixel value is retained as the minimum value, and when the pixel value is larger than the maximum value, the pixel value is retained as the maximum value. Then, the frame termination determination processing in step S3108 is performed.

In the termination determination processing in step S3108, it is determined as frame termination (S3108: Yes), and in a case where the frame is not the key frame (S4304: No), the processing proceeds to region determination in step S4406. In a case where the frame is the key frame (S4304: Yes), operation parameters for rear-stage data shift processing and bit reduction processing for converting the first difference image data and the second difference image data into an image before compression are respectively set. Next, the maximum value and the minimum value of the first difference image data and the second difference image data are reset, and the processing proceeds to region determination in step S4406.

In step S4406, it is determined whether or not processing is processing of the first difference image data. In the case of the first difference image data (S4306: Yes), the data shift processing (S4407) and the bit reduction processing (S4408) are performed by using a first operation parameter, and the first operation parameter is set as image restoring information (S4409). In a case where the data is not the first difference image data (S4306: No), data shift processing (S4410) and bit reduction processing (S4411) are performed by using a second operation parameter, and image restoring information using the second operation parameter is generated as metadata (S4412).

Due to the compression pre-processing as described above, it is possible to reduce the number of bits of the pixel value of the sensor image. In addition, setting is performed for every grating pattern with a phase difference and the image compression pre-processing is performed, and thus image quality deterioration can be prevented in further compression, and image quality improvement after development can be expected.

Example 4

In this example, description will be given of an imaging system including an imaging device and a reproduction device which speed up processing and reduce the number of components.

Figure 40:
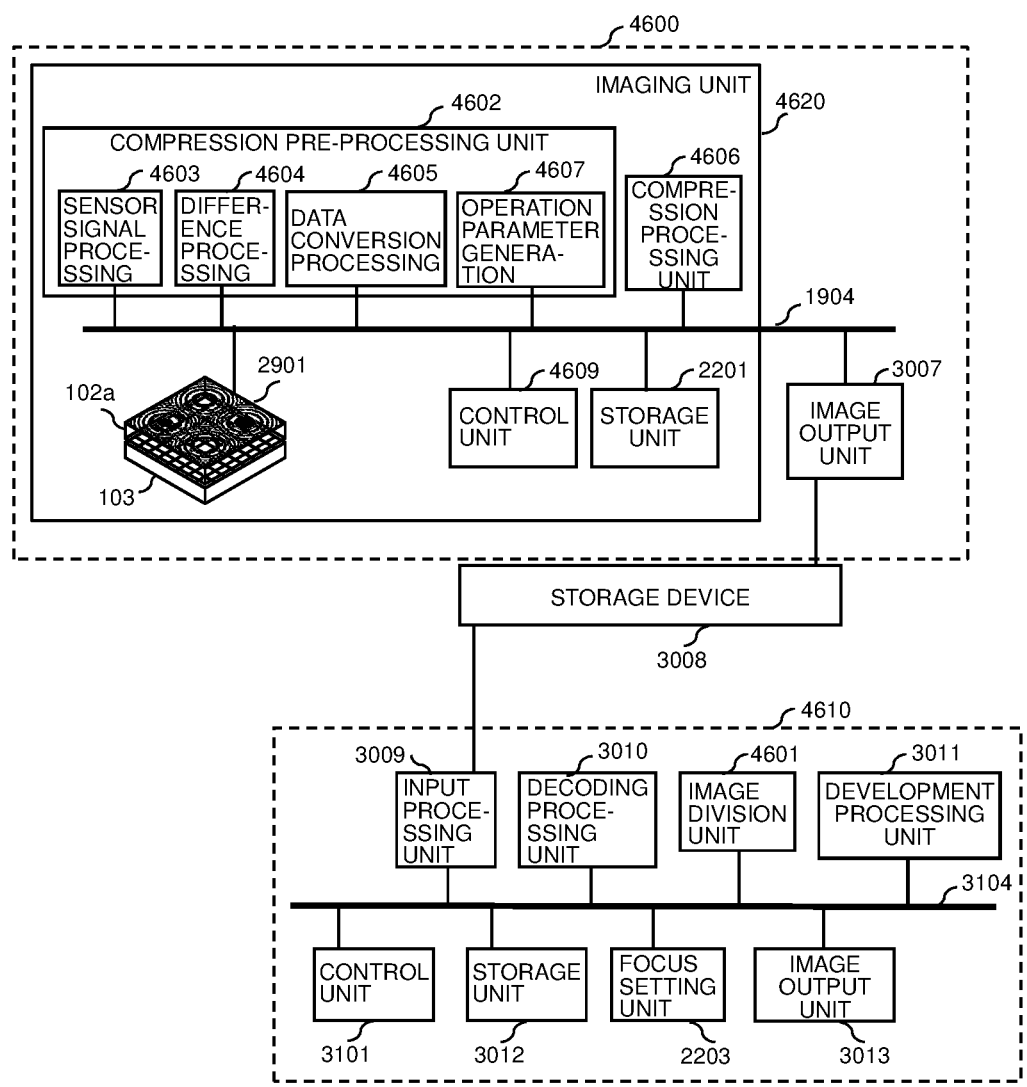
FIG. 40 is a configuration diagram of an imaging system in Example 4.

FIG. 40 is a configuration diagram of the imaging system in this example. FIG. 40 illustrates the imaging system including an imaging device 4600 and a reproduction device 4610 which speed up processing and reduce the number of components of the imaging device 3800 in FIG. 33. In FIG. 40, the same reference numeral will be given to the same processing as in FIG. 33, and description thereof will be omitted.

In FIG. 40, the imaging device 4600 includes an imaging unit 4620 and the output processing unit 3007. The imaging unit 4620 includes the image sensor unit 103, the transparent grating substrate 102a, the modulator 2901, a compression pre-processing unit 4602, a control unit 4609, a compression processing unit 4606, and the storage unit 2201.

The compression pre-processing unit 4602 is constituted by sensor signal processing 4603, difference processing 4604, data conversion processing 4605, and operation parameter generation unit 4607.

Figure 41:
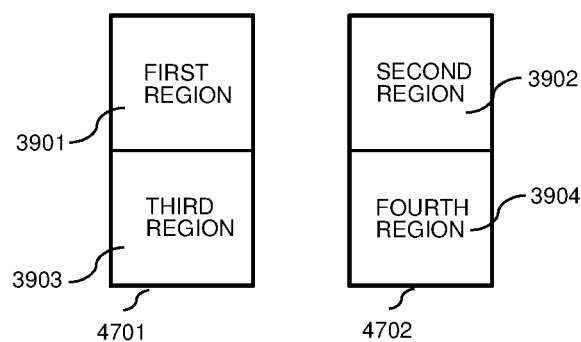
FIG. 41 is a view illustrating a screen division example in Example 4.

The control unit 4609 designates a screen division position of a signal output from the image sensor unit 103 in addition to the function of 3802. As the screen division position, for example, an image division example in a case where a first region and a third region are handled as one image, and a second region and a fourth region are handled as one image is illustrated in FIG. 41. A reference numeral 4701 indicates a composition image region of the first region and the third region of the sensor image, and a reference numeral 4702 indicates a first composition image region of the second region and the fourth region of the sensor image.

As an output of the image signal, the image sensor unit 103 sequentially outputs a first line of the first region 3901, a first line of the second region 3901, a second line of the first region 3901, and a second line of the second region 3901. In addition, output of one frame is terminated at a final line of the third region 3901 and a final line of the fourth region 3901.

The control unit 4609 transmits signal switching timing of the first region 3901, the second region 3902, the third region 3903, and the fourth region 3904 in the compression pre-processing unit 4602, and controls a difference image between the composition image region 4701 and the composition image region 4702 as one image in the compression processing unit 4606.

For example, in the sensor signal processing 4603, demosaicing processing of generating an R signal, a G signal, and a B signal from the image signal output in the order of RGB Bayer arrangement is performed. In the demosaicing processing, processing is performed by retaining a signal subsequent to a pixel to be processed in the storage unit 2201 in an amount corresponding to necessary time for delay so as to use the signal later. In the sensor signal processing 4603, the demosaicing processing is performed in response to a region switching instruction given by the control unit 4609. For example, with respect to a pixel at a boundary line of regions, for example, edge processing such as pixel expansion and folding processing is performed without using values of signals of other regions.

In the difference processing 4604, processing is performed for every horizontal line in accordance with switching timing of the control unit 4609. For example, first, pixel data transmitted at a first line of a signal of the first region is retained, and a subsequently transmitted difference of pixel data of a first line of a signal of the second region is taken. Finally, a difference between final line pixel data of a signal of the third region and final line pixel data of a signal of the fourth region is taken, and the processing of the frame is terminated.

The operation parameter generation unit 4607 generates operation parameters as in the operation parameter generation unit 3806 in FIG. 33.

In the data conversion processing 4605, for example, data shift processing and bit reduction processing are performed by using operation parameters set in advance by using a maximum value and a minimum value of a difference image to a previous frame of a frame, and image data suitable for compression is sequentially output.

Figure 42:
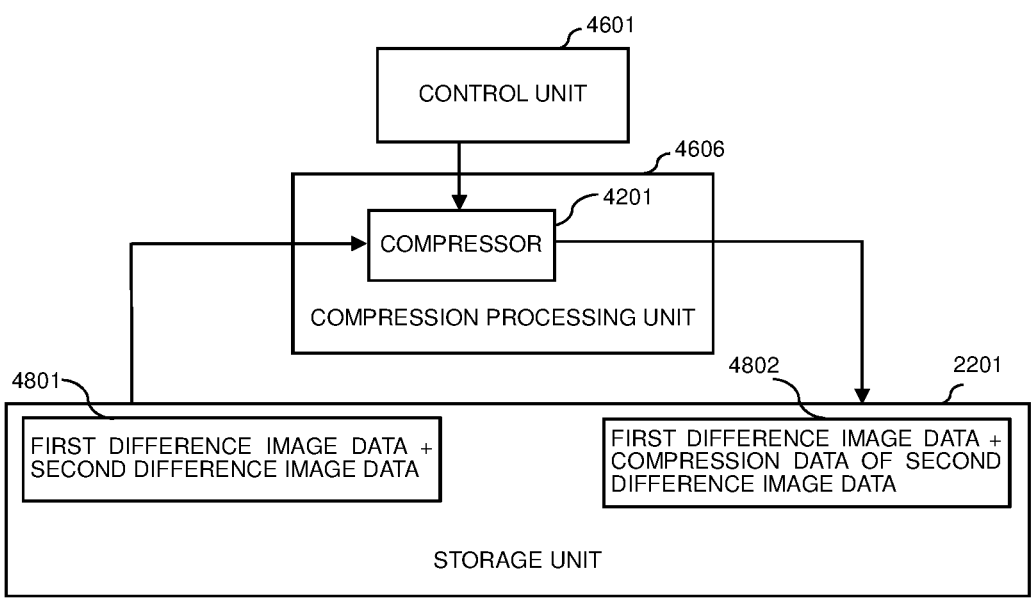
FIG. 42 is a view illustrating configuration example of a compression pre-processing unit in Example 4.

The control unit 4609 causes the compression processing unit 4606 to compress output data of the compression pre-processing unit 4602. FIG. 42 illustrates a configuration example of the compression pre-processing unit 4602. In FIG. 42, the same reference numeral will be given to the same configuration as in FIG. 36 and FIG. 40, and description thereof will be omitted. A reference numeral 4801 indicates composition image data of the second difference data continuous from the first difference image data stored in the storage unit 2201, and a reference numeral 4802 indicates data obtained by compressing a moving image composed of continuous composition image data stored in the storage unit 2201.

Since the control unit 4609 performs control so that the first difference image data and the second difference image data continuous therefrom are compressed as one image, the compressor 4201 of the compression processing unit 4606 may be one or more pieces. The output processing unit 3007 outputs data obtained by compressing the moving image to the storage device in a state of including the operation parameters used in the data conversion processing 4605. Note that, in a case where the imaging device 4600 performs two-division type processing in a switching manner instead of the four-division type as in modulator 2901, division information in the reproduction device 4610 is included in the operation parameters.

A reference numeral 4601 in the reproduction device 4610 illustrated in FIG. 40 indicates an image division unit. The reproduction device 4610 inputs compressed moving image data stored in the storage device 3008 from the input processing unit 3009, and performs decoding processing of converting the compressed moving image data into each sheet of uncompressed image by the decoding processing unit 3010. The image division unit 4601 performs division into the first difference image data and the second difference image data, and outputs the first difference image data and the second difference image data to the development processing unit 3011.

Figure 43:
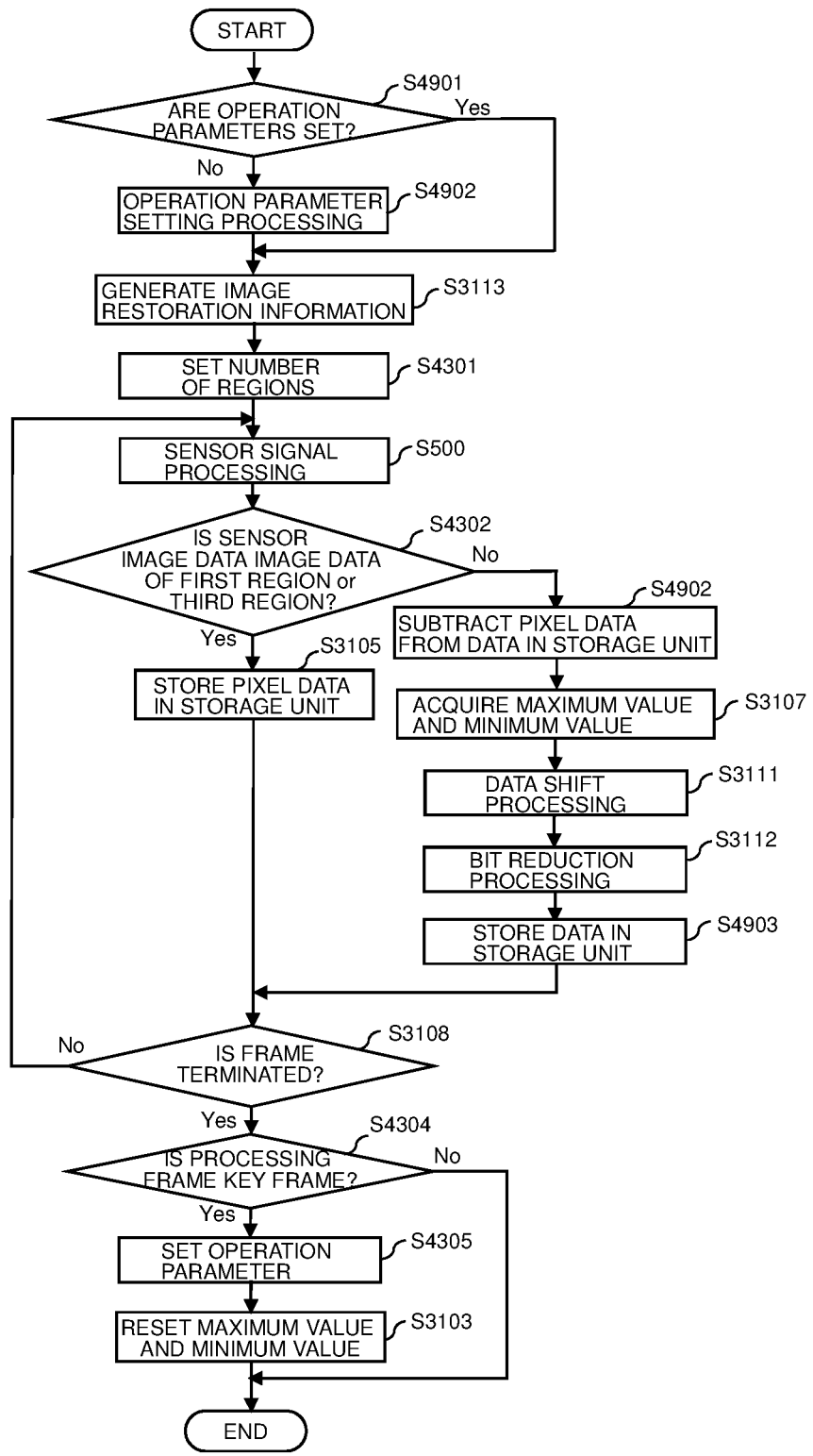
FIG. 43 is a view illustrating a processing flow in Example 4.

FIG. 43 illustrates a processing flow example of the compression pre-processing unit 4602 illustrated in FIG. 40. The same reference numeral will be given to the same processing as in FIG. 37, and description thereof will be omitted. In FIG. 43, in an initial value state in which operation parameters are not set (S4901: No), the compression pre-processing unit 3801 acquires a minimum value and a maximum value from the first difference image data, sets the operation parameters by using the minimum value and the maximum value (S4902), and generates image restoration information metadata from the operation parameters set in step S3113. In a case where the operation parameters are set (S4901: Yes), the processing proceeds to step S3113 as is.

Signal processing in steps S4301 and S500 is executed, and region determination processing is performed in step S4302. In step S4302, in a case where it is determined as image data of the first region or image data of the third region (Yes), in step S3105, the image data is stored in the storage unit. In step S4302, in a case where it is determined that the image data is not the image data of the first region or the image data of the third region (No), difference image data is obtained through difference processing with pixel data in the storage unit (S4902). After performing the processing of acquiring the minimum value and the maximum value in step S3107, the data shift processing S3111 and the bit reduction processing S3112 are performed by using operation parameters set in advance to generate pixel data before compression processing, and stores the compression pre-processing pixel data in the storage unit (S4903). The above-described processing is performed until frame is terminated. In a case where it is determined as frame termination (Yes) in step S3108, and it is determined as the key frame in step S4304, the operation parameters are set from the maximum value and the minimum value which are recorded (S4305), and reset of the minimum value and the maximum value is performed (S3103).

Due to the compression pre-processing as described above, it is possible to reduce the number of bits of the pixel value of the sensor image, it is possible to realize compression of a moving image with a small number of compressors, and it is possible to output a video with short delay time.

Example 5

In this example, description will be given of a reproduction device corresponding to development processing of a video including a color difference signal.

Figure 44:
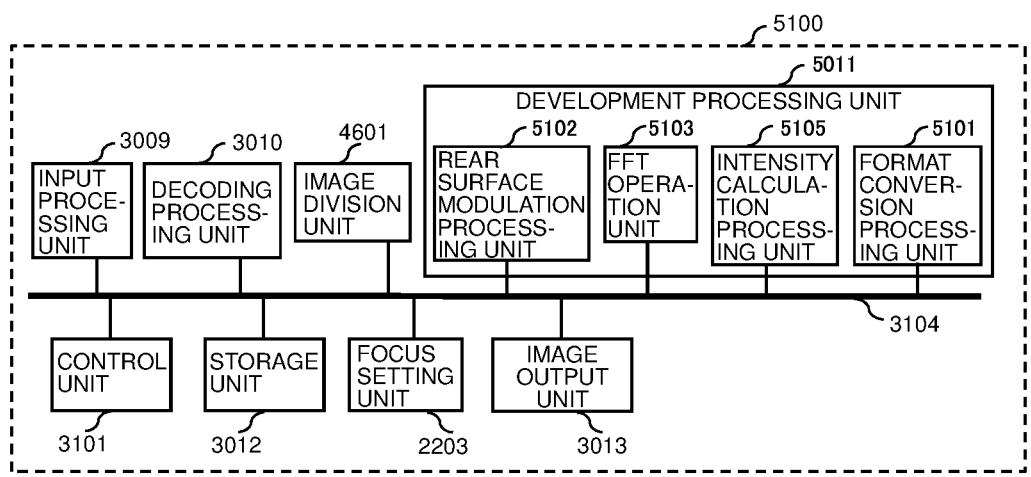
FIG. 44 is a configuration diagram of a reproduction device corresponding to development processing of a video including a color difference signal in Example 5.

FIG. 44 is a configuration diagram of a reproduction device 5100 corresponding to the development processing of a video including a color difference signal in this example. In FIG. 44, a development processing unit 5011 includes a rear surface modulation processing unit 5102, an FFT operation unit 5103, an intensity calculation processing unit 5105, and a format conversion processing unit 5101. For example, the format conversion processing unit 5101 converts a YUV format image expressed by using a luminance signal Y and two color difference signals into an RGB format image expressed by signals of red, blue, and green.

The rear surface modulation processing unit 5102, the FFT operation unit 5103, and the intensity calculation processing unit 5105 of the development processing unit 5011 perform the same processing as in the development processing unit 3011 described in FIG. 26, the rear surface modulation processing unit 5102 performs rear surface pitch determination and rear surface grating intensity modulation, the FFT operation unit 5103 performs two-dimensional FFT operation and spectrum cutting processing, and the intensity calculation processing unit 5105 performs intensity calculation and image composition processing in the case of using four sheets of modulator patterns.

Here, in the case of compressing a moving image, since resolution of color components is low with the human eyes, the YUV format in which the number of pixels of a color difference component is reduced, and compression efficiency is raised is frequently used. After decoding a moving image, the decoding processing unit 3010 can output the YUV format image as is without conversion into the RGB format image. However, the entirety of the RGB format image is positive data, but in the YUV format color difference component, both positive data and negative data exist. Accordingly, correct intensity can be calculated by the intensity calculation processing unit 5105. Accordingly, an image output from the decoding processing unit 3010 in the YUV format is converted into RGB format by the format conversion processing unit 5101 before the intensity calculation processing unit 5105.

Figure 45:
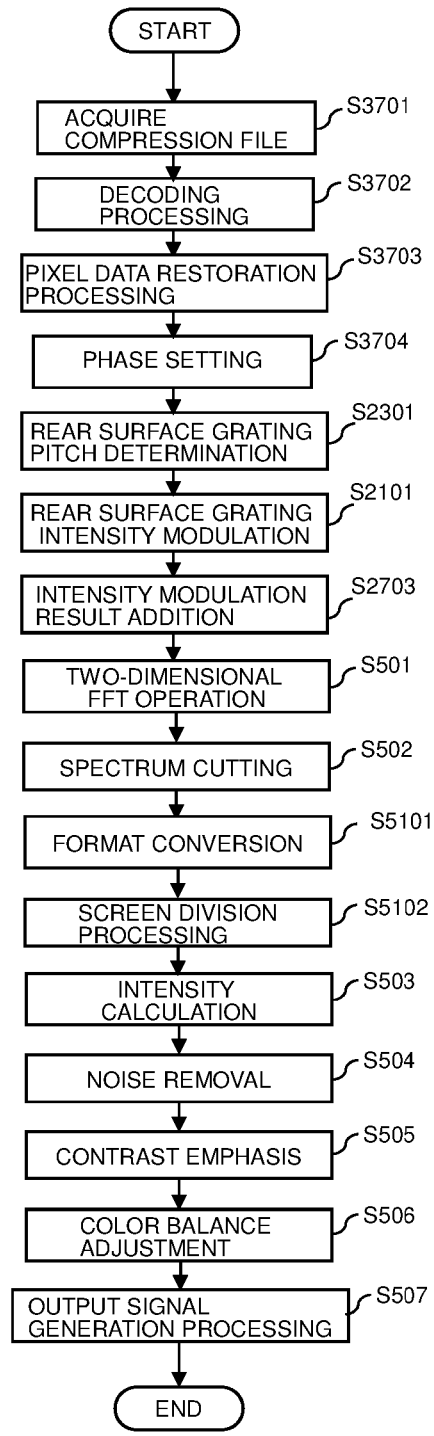
FIG. 45 is a view illustrating a processing flow of the reproduction device in Example 5.

FIG. 45 illustrates a processing flow of the reproduction device 5100. The same reference numeral will be given of the same configuration as in FIG. 32, and description thereof will be omitted. In the reproduction device 5100, the YUV format image is processed in decoding processing in step S3702 to step S501. A spectrum is cut in step S502, and format conversion processing is performed in step S5101. Here, in the case of using four modulator patterns, two images with different phases are in a connected state up to step S5101, and the connected image are divided into two images in step S5102. In step S503, intensity of each pixel is calculated, and intensity composition of two images is performed. Then, similar processing as in FIG. 32 is performed.

According to this example, since a part of the development processing is performed in the YUV format in which the number of pixels is smaller in comparison to the RGB format, a development processing load can be reduced, and a reproduction device in which a processing speed is high and cost is low can be realized.

Example 6

In this example, description will be given of an imaging system that applies the fringe scanning method, compresses captured moving image data, and transmits the compressed data.

Figure 46:
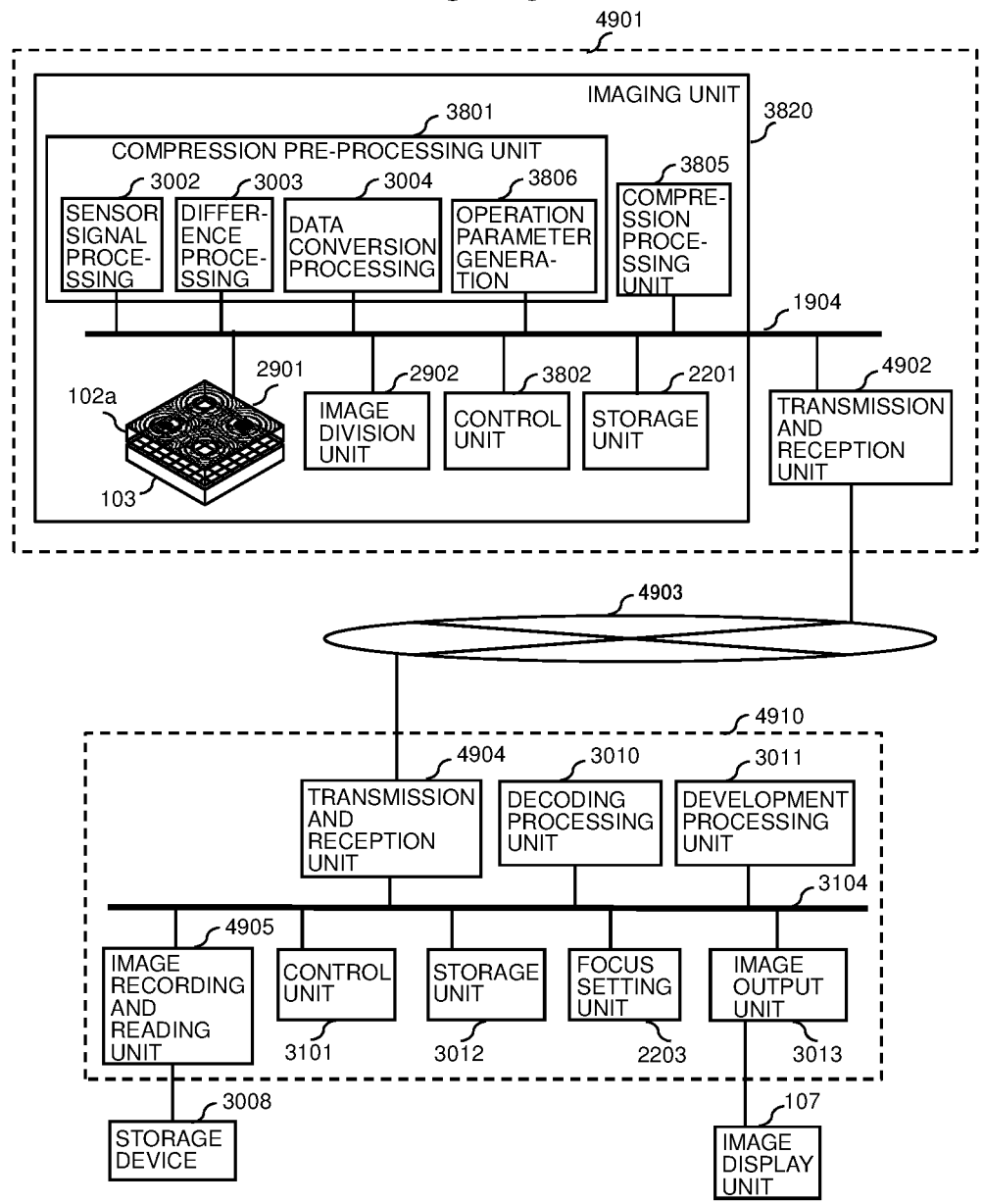
FIG. 46 is a configuration diagram of an imaging and reproduction system including the imaging device and the reproduction device in Example 6.

FIG. 46 is a configuration diagram of the imaging system that applies the fringe scanning method, compresses the captured moving image data, and transmits the compressed data in this example. In FIG. 46, the same reference numeral will be given to the same configuration as in FIG. 26, and description thereof will be omitted. The imaging system includes an imaging device 4901 and a reproduction device 4910. The imaging device 4901 and the reproduction device 4910 are connected by a communication path 4903.

The imaging device 4901 includes the modulator 2901 including the image sensor unit 103, the transparent grating substrate 102a, the control unit 3802, the compression pre-processing unit 3801, the compression processing unit 3805, a transmission and reception unit 4902, the storage unit 2201, and the image division unit 2902. In addition, the reproduction device 4910 includes a transmission and reception unit 4904, an image recording and reading unit 4905, the storage device 3008, the decoding processing unit 3010, the development processing unit 3011, the storage unit 3012, the focus setting unit 2203, the image display unit 107, the image output unit 3013, and the control unit 3101.

The transmission and reception unit 4902 converts compressed image data output from the compression processing unit 3805 or metadata into a format transmitted with a communication path, and performs communication processing. That is, the transmission and reception unit 4902 transmits and outputs data compressed by the compression processing unit 3805 through the communication path 4903.

As a communication interface of the transmission and reception unit 4902, a method such as wired local area network (LAN) or wireless LAN such as Wi-Fi (registered trademark) (not illustrated) can be used, and connection to a communication network can be established through a base station by using a mobile communication network of as 3$^{rd}$ generation mobile communication system (hereinafter, noted as "3G") such as a global system for mobile communication (GSM (registered trademark)), wideband code division multiple access (W-CMDA), CDMA2000, and universal mobile telecommunications system (UMTS) which are mobile communication systems, long term evolution (LTE) system, and new next-generation communication system called 5$^{th}$ generation (5G). In addition, a chip capable of establishing communication in a plurality of different systems may be mounted, and the chip may be appropriately used in conformity to an environment in which the imaging device 4901 is used.

The transmission and reception unit 4904 of the reproduction device 4910 includes a similar communication interface as in the transmission and reception unit 4902 of the imaging device 4901. Note that, it is not necessary for the communication interface of the transmission and reception unit 4904 to be completely the same as that of the transmission and reception unit 4902, and at least one or more may be provided. The transmission and reception unit 4904 outputs data received through the communication path 4903 to the image recording and reading unit 4905 as image data or accessary metadata. The image recording and reading unit 4905 stores the image data and the accessary metadata which are obtained in the storage device 3008. The subsequent processing is the same as in FIG. 26, and thus description thereof will be omitted.

As described above, according to this example, since a video before development processing are transmitted through a network, it is possible to simplify the configuration of the imaging device 4901, and a reduction in size, weight, and cost of the imaging device is realized. In addition, even in moving image display, the moving image can be displayed without a variation in luminance for every frame. In addition, since an image after fringe scanning is transmitted, focus adjustment or distance measurement becomes possible in the development processing unit. Accordingly, when desiring to confirm images after imaging, it is possible to focus on a position desired to be viewed, or it is possible to measure a distance.

Example 7

In this example, description will be given of a system that records and reproduces a video, for example, from a plurality of monitoring cameras.

Figure 47:
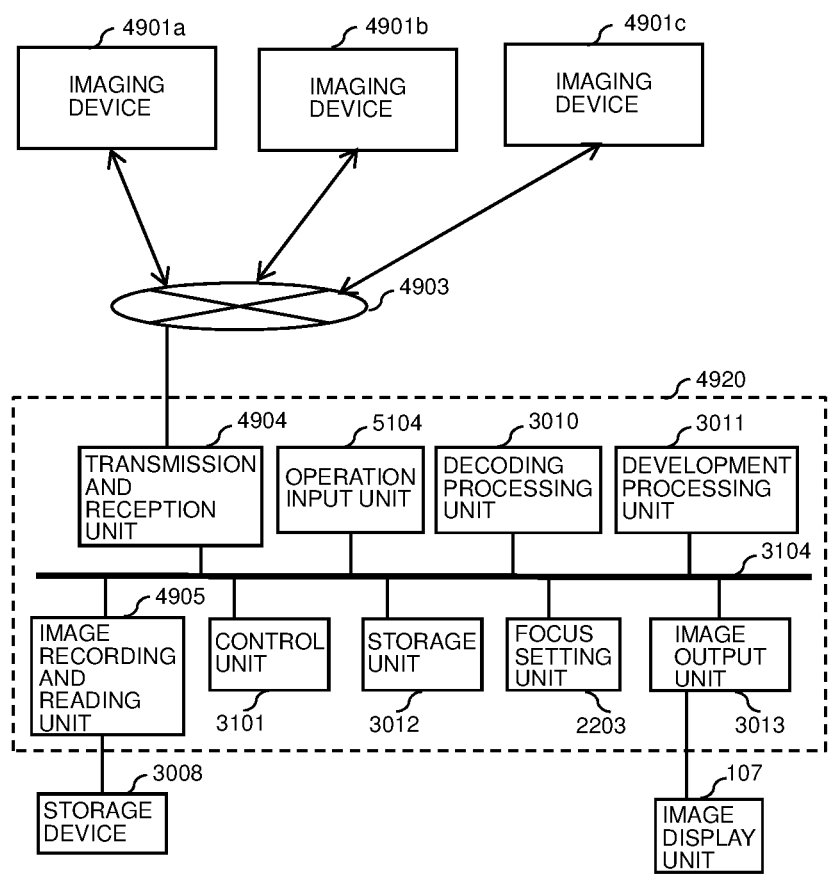
FIG. 47 is a configuration diagram of an imaging and reproduction system including the imaging device and the reproduction device in Example 7.

FIG. 47 is a configuration diagram of an imaging system in this example. In FIG. 47, the same reference numeral will be given to the same configuration as in FIG. 46, and description thereof will be omitted. In FIG. 47, reference numerals 4901a, 4901b, and 4901c indicate imaging devices, and are similar to the imaging device 4901 in FIG. 52. For example, the imaging device 4901a, the imaging device 4901b, and the imaging device 4901c are monitoring cameras, and are connected to the communication path 4903.

A reference numeral 4920 indicates a recording and reproduction device, and has a configuration in which an operation input unit 5104 is added to the reproduction device 4910 in FIG. 46.

The transmission and reception unit 4904 acquires compression images transmitted from the imaging device 4901a, the imaging device 4901b, and the imaging device 4901c through the communication path 4903. The image recording and reading unit 4905 associates the compression images acquired by the transmission and reception unit 4904 with information of an imaging device and imaging time, and stores the compression images in the storage device 3008.

For example, the operation input unit 5104 inputs signals of sensors and the like which detect partial or total movement of a keyboard or a mouse that is a connected device, a touch pad, a touch panel, a remote controller, and persons. An operator who tries to perform desired control with respect to the recording and reproduction device 4920 operates, for example, a device that is connected to the operation input unit 5104. For example, the control unit 3101 gives an instruction for a compression image to be read by the image recording and reading unit 4905 on the basis of a signal input from the operation input unit 5104, gives an instruction for the decoding processing unit 3010 to perform decoding processing on the read out compression image, gives an instruction for the development processing unit 3011 to perform development processing on the decoded image, and outputs the developed image to the image display unit 107. In addition, in a case where an operator gives an instruction for focus change, a distance set by the focus setting unit 2203 is changed to adjust the focus.

Even in the imaging system to which a plurality of monitoring cameras are connected, since the development processing is performed as necessary, a reduction in power consumption and a reduction in processing load can be realized.

Note that, in this example, description has been given of an example in which three imaging devices are connected, but the number of connections is not limited. In addition, even in connection of one device, the production processing is performed as necessary, and thus a reduction in power consumption and a reduction processing load can be realized.

Example 8

In this example, for example, description will be given of an imaging system in which the imaging device, the recording device, and the reproduction device are located at a distance.

Figure 48:
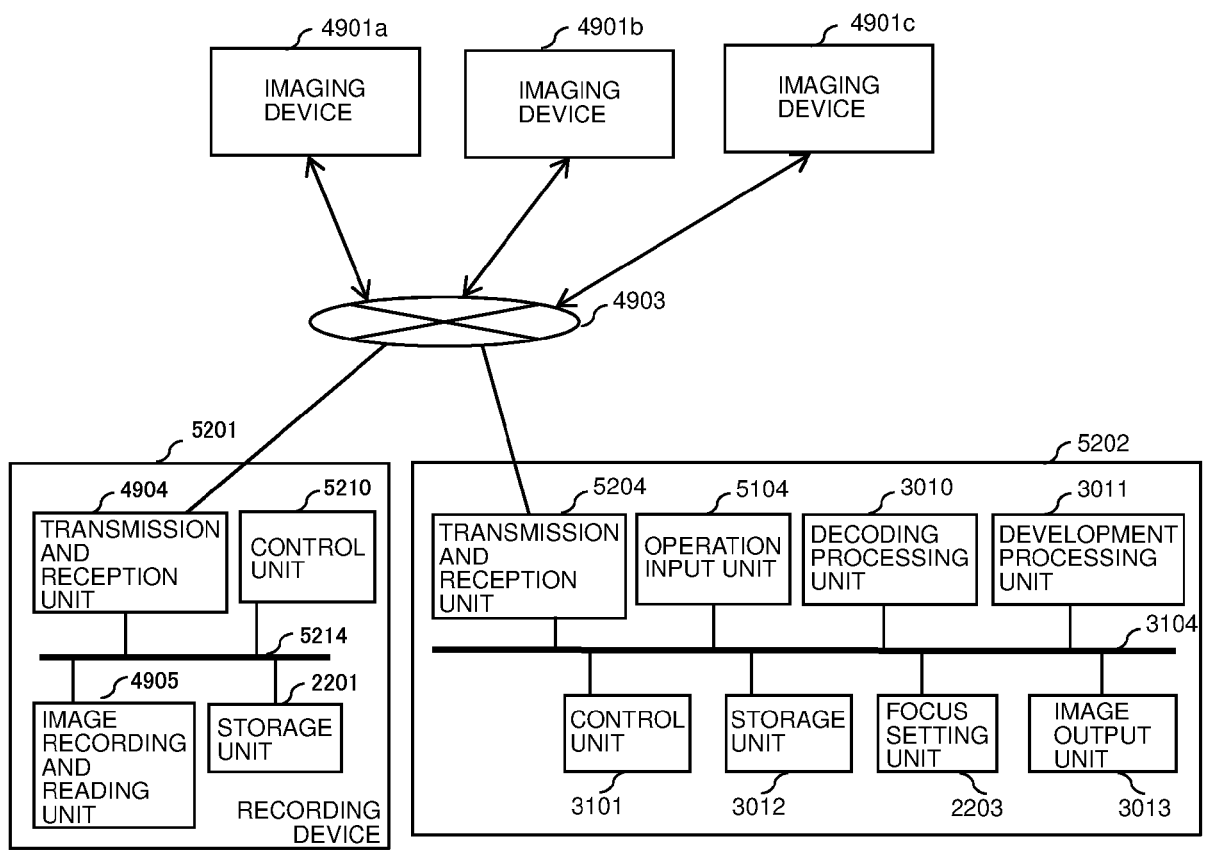
FIG. 48 is a configuration diagram of an imaging system in Example 8.

FIG. 48 is a configuration diagram of the imaging system in this example. In FIG. 48, the same reference numeral will be given of the same configuration as in FIG. 46 and FIG. 47, and description thereof will be omitted.

A reference numeral 5201 indicates a recording device, and includes the transmission and reception unit 4904, the image recording and reading unit 4905, the storage unit 2201, and a control unit 5210. The transmission and reception unit 4904 acquires a compression image transmitted from the imaging device 4901a, the imaging device 4901b, and the imaging device 4901c through the communication path 4903. The image recording and reading unit 4905 associates the compression images acquired by the transmission and reception unit 4904 with information of an imaging device and imaging time, and stores the compression images in the storage unit 2201.

A reference numeral 5202 indicates a reproduction device, and includes a partial configuration in the recording and reproduction device 4920 illustrated in FIG. 47, and a transmission and reception unit 5204.

The control unit 3101 of the reproduction device 5202 acquires image information recorded in the recording device 5201 through the transmission and reception unit 5204 and the communication path 4903, for example, in response to an instruction of an operator (not illustrated). The control unit 3101 makes a request for the recording device 5201 to transmit an image selected by the operator from the acquired image information through the transmission and reception unit 5204 and the communication path 4903. The image recording and reading unit 4905 of the recording device 5201 extracts the requested image from images recorded in the storage unit 2201, and transmits the image to the reproduction device 5202 through the transmission and reception unit 4904 and the communication path 4903. In the reproduction device 5202, the image received by the transmission and reception unit 5204 is decoded by the decoding processing unit 3010 on the basis of the instruction of the control unit 3101, the decoded image is developed by the development processing unit 3011, and the resultant image is output to the image output unit 3013.

Even in the imaging system to which a plurality of monitoring cameras are connected as described above, a recording device providing position is not limited, and thus a storage device having large recording capacity is realized, and long-time recording is possible. Note that, in this example, description has been given of an example in which three imaging devices are connected, but the number of connections is not limited.

Example 9

In this example, description will be given of an imaging and reproduction device in which an imaging unit, a recording unit, and a reproduction unit are integrally formed.

Figure 49:
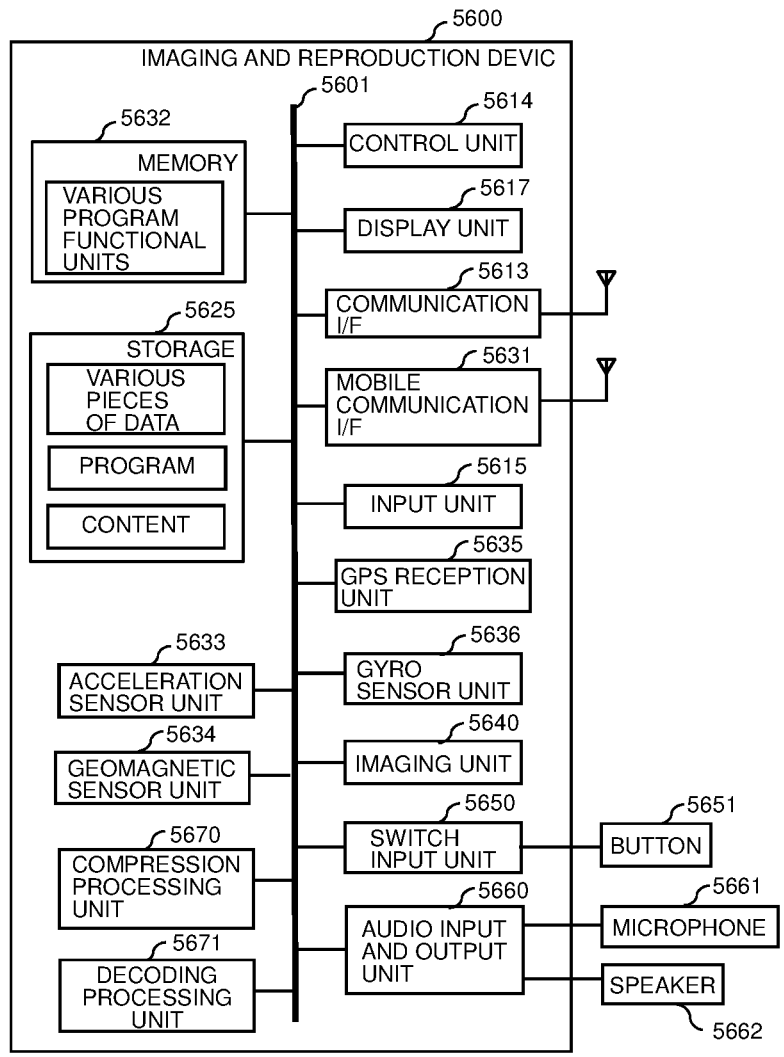
FIG. 49 is a configuration diagram of an imaging and reproduction device in Example 9.

FIG. 49 is a configuration diagram of an imaging and reproduction device in this example. In FIG. 49, for example, the imaging and reproduction device 5600 includes a communication I/F 5613, a control unit 5614, a display unit 5617, an input unit 5615, a storage 5625, a mobile communication I/F 5631, a memory 5632, an acceleration sensor unit 5633, a geomagnetic sensor unit 5634, a GPS reception unit 5635, a gyro sensor unit 5636, an imaging unit 5640, a switch input unit 5650, an audio input and output unit 5660, a compression processing unit 5670, and a decoding processing unit 5671, and the respective processing units are connected through a bus 5601.

In addition, the imaging and reproduction device 5600 stores an application program in the storage 5625, and the control unit 5614 develops the program in the memory 5632 from the storage 5625, and the control unit 5614 executes the program, thereby realizing various functions. In the following description, description will be given on the assumption that various functions realized when the control unit 5614 executes respective application programs are realized by various program functional units as main component for simplification of description.

Note that, the application program may be stored in the storage 5625 until the imaging and reproduction device 5600 is shipped, or may be stored in an optical medium such as a compact disk (CD) and a digital versatile disk (DVD), or a medium such as a semiconductor memory, and may be installed in the imaging and reproduction device 5600 through a medium connection part (not illustrated). In addition, the application program may be installed after being downloaded from an external network (not illustrated) through the communication I/F 5613 and a wireless rooter (not illustrated). Alternatively, the application program may be installed after being downloaded from a distribution source through a base station (not illustrated) via the mobile communication I/F 5631.

In addition, after establishing connection to a personal computer (PC) that acquires the application program through a network through an external device connection I/F (not illustrated), the application program may be moved or copied from the PC to the imaging and reproduction device 5600 to be installed.

In addition, the application program can be realized by hardware as a processing unit having the same function. In the case of realization by hardware, each processing unit realizes each function as main body.

For example, the communication I/F 5613 is connected to a wireless rooter (not illustrated) by wireless LAN or the like. In addition, the communication I/F 5613 is connected to an external network through a wireless rooter, and performs transmission and reception of information with a server on the external network. In addition to or instead of a communication function with the wireless rooter, direct communication with the server through the wireless rooter can be established by a method of a wireless LAN such as Wi-Fi. Chips performing other communication methods can be respectively mounted on the communication I/F 5613. In addition, the chips may be mounted as one chip that handles a plurality of communication methods. For example, data transmission and reception is directly performed by a function that performs communication directly with another information device such as Bluetooth (registered trademark). The mobile communication I/F 5631 can be connected to a communication network through a base station by using a mobile communication network of 3G such as a GSM system, a W-CDMA system, and a CDMA2000 system, and a UMTS system, an LTE system, and a new next-generation communication system called 5G, and can perform information transmission and reception to and from a server on a communication network. In addition, priority may be given to connection with an external network by the communication I/F 5613 over communication network connection by the mobile communication I/F 5631.

The control unit 5614 receives a user's operation request through the input unit 5615, and controls the display unit 5617, the communication I/F 5613, and various program functional units.

In addition, the control unit 5614 can acquire various pieces of information from the server on the external network through the communication I/F 5613 and the wireless rooter 10, or through the mobile communication I/F 5631 and the base station 18, and also has a function of transmitting the various pieces of information to various program functional units.

The storage 5625 is controlled by an instruction of the control unit 5614, and can retain the application program. In addition, the storage 5625 also retains various pieces of information created by the application program. In addition, the storage 5625 may retain a content such as a video/audio stream from a signal received form the communication I/F 5613 or the mobile communication I/F 5631. In addition, the storage 5625 may be embedded in the imaging and reproduction device 5600, or may be a portable memory that is detachable from the imaging and reproduction device 5600.

The memory 5632 is controlled by an instruction of the control unit 5614. Functional units of the application program stored in the storage 5625 are developed into the memory 5632 by the control unit 5614. Although not illustrated, for example, the processing function of the compression pre-processing unit 3801 or the development processing unit 3011 in FIG. 33 is stored in the storage 5625, and is developed into the memory 5632 by the control unit as necessary.

The display unit 5617 displays an image and a video stored in the storage 5625, a video that is broadcasted and distributed, a UI for various operations, and the like. The image and video which are displayed may be images generated by the application program, images or videos received from a server on an external network through the communication I/F 5613, or images or videos distributed from a server on a communication network through the mobile communication I/F 5631. In addition, for example, the display unit 5617 may be configured integrally with a touch panel or the like to be described below.

The input unit 5615 is an input unit that receives an operation on the imaging and reproduction device 5600 from a user, and inputs control information related to an input operation, and a touch panel or the like can be used as the input unit 5615. Hereinafter, in this example, description will be given of an example in which the touch panel is used, but various operations can be performed by using physical buttons.

In the case of using the touch panel, when performing an operation (drag operation) of moving an arbitrary object (icon) or the like on the touch panel in a state of touching the object with a finger, or an operation (flick operation) of flipping a finger on a screen, it is possible to freely move the object or the like. In addition, when performing an operation (tap operation) of tapping the object or the like once with a finger or an operation (double-tap operation) of tapping the object or the like twice with the finger, the object (icon) or the like or can be activated or switching to another screen can be performed. In this example, the respective operations on the touch panel are referred to as the drag operation, the flick operation, and the tap operation in the following description.

The acceleration sensor unit 5633 measures acceleration applied to the imaging and reproduction device 5600. For example, the control unit 5614 can know which part of the imaging and reproduction device 5600 is an upward side by measuring gravitational acceleration by the acceleration sensor unit 5633, and performs display so that an upward side of a screen to be displayed on the display unit 5617 matches the upward side measured by the acceleration sensor unit 5633, thereby displaying the screen that matches a manner of holding the imaging and reproduction device 5600 by the user.

The geomagnetic sensor unit 5634 measures geomagnetism by using a plurality of magnetic sensors.

The GPS reception unit 5635 receives signals transmitted from a plurality of satellites by using global positioning system (GPS). The control unit 5614 can calculate position information of the imaging and reproduction device 5600 on the basis of the signal received by the GPS reception unit 5635.

The gyro sensor unit 5636 measures an angular velocity of the imaging and reproduction device 5600 which occurs in a case where the user moves the imaging and reproduction device 5600 or the like.

The imaging unit 5640 includes, for example, the image sensor unit 103, the transparent grating substrate 102a, the modulator 2501 or the modulator 2901, and the like. Shutter timing of the image sensor unit 103, pattern switching timing of the modulator 2501, and the like are controlled by the control unit 5614.

An audio input signal from a microphone mounted on the imaging and reproduction device 5600, and an audio output signal to the speaker 5662 are input and output to and from the audio input and output unit 5660, and thus control of volume of the audio input and output is performed by the control unit 5614.

The switch input unit 5650 takes in switch information in correspondence with an operation of the physical button 5651 (may be one piece or a plurality of pieces), and the switch information is taken into the control unit 5614 through the bus 5601, and is used in control of various application programs as necessary. For example, the switch information is used to control of magnitude adjustment (volume up and down) of an audio output in correspondence with two buttons of the button 5651 as an example.

In the imaging and reproduction device 5600, a video captured by the imaging unit 5640 is compressed by the compression processing unit 5670 and is retained in a storage without being subjected to development processing. The compressed video is decoded by the decoding processing unit 5671 through an operation from the input unit 5615 when a user desires to view a developed image, and the image is displayed on the display unit 5617 after being developed.

In this example, for example, even in a device such as a mobile information terminal in which imaging, reproduction, and storage are integrated and storage capacity is not large, since captured images are compressed and retained, many images for which focus change is possible can be retained.

Figure 50:
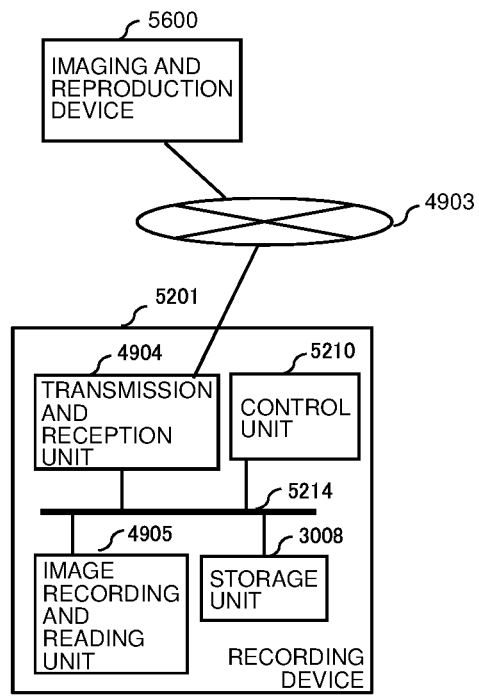
FIG. 50 is a configuration diagram of an imaging and reproduction system including the imaging and reproduction device in example 9.

FIG. 50 illustrates an imaging and reproduction system in which the imaging and reproduction device 5600 in FIG. 49 and the recording device 5201 in FIG. 48 are connected with the communication path 4903. The imaging and reproduction device 5600 is connected to the recording device 5201 on an external side, and thus large-capacity recording is possible. Here, the capacity of images for which focus setting is possible later can be lowered by the compression processing unit 5670 of the imaging and reproduction device 5600, and the amount of transmission can be reduced.

Example 10

In this example, description will be given of a video display system that is constituted by a head-mounted type video display device and an operation processing device.

Figure 51:
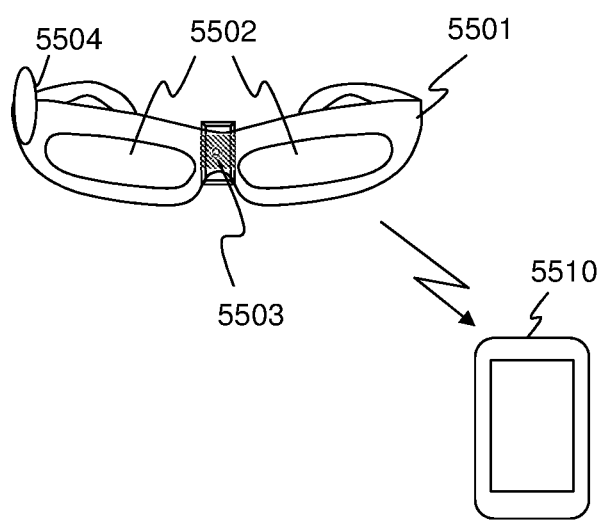
FIG. 51 is a configuration diagram of a video display system in Example 10.

FIG. 51 is a schematic view of the video display system constituted by the head-mounted type video display device and the operation processing device. In FIG. 51, a reference numeral 5501 indicates the video display device, and a reference numeral 5510 indicates the operation processing device. The video display device 5501 includes a display unit 5502, an imaging unit 5503, a light source unit 5504, and an overall control unit (not illustrated). Note that, the head-mounted type video display device may not be an eyeglass type as long as the video display device has a shape that can be mounted on the head, and the video display unit may be a monocular type.

For example, the imaging unit 5503 includes an image sensor unit and a modulator such as a configuration including the image sensor unit 103 and the modulator 2501 in FIG. 19, and a configuration including the image sensor unit 103 and the modulator 9501 in FIG. 23.

The display unit 5502 displays a video on a part or the entirety of the display unit 5502, for example, at a position visible for a user who wears the video display device 5501. Alternatively, the display unit 5502 reflects light with the display unit 5502 to form an image on eyes of the user.

For example, the operation processing device 5510 is a portable information terminal in which the imaging and reproduction device 5600 illustrated in FIG. 55, or the imaging unit 5640 of the imaging and reproduction device 5600 is constituted by an image sensor unit and a lens unit.

Figure 52:
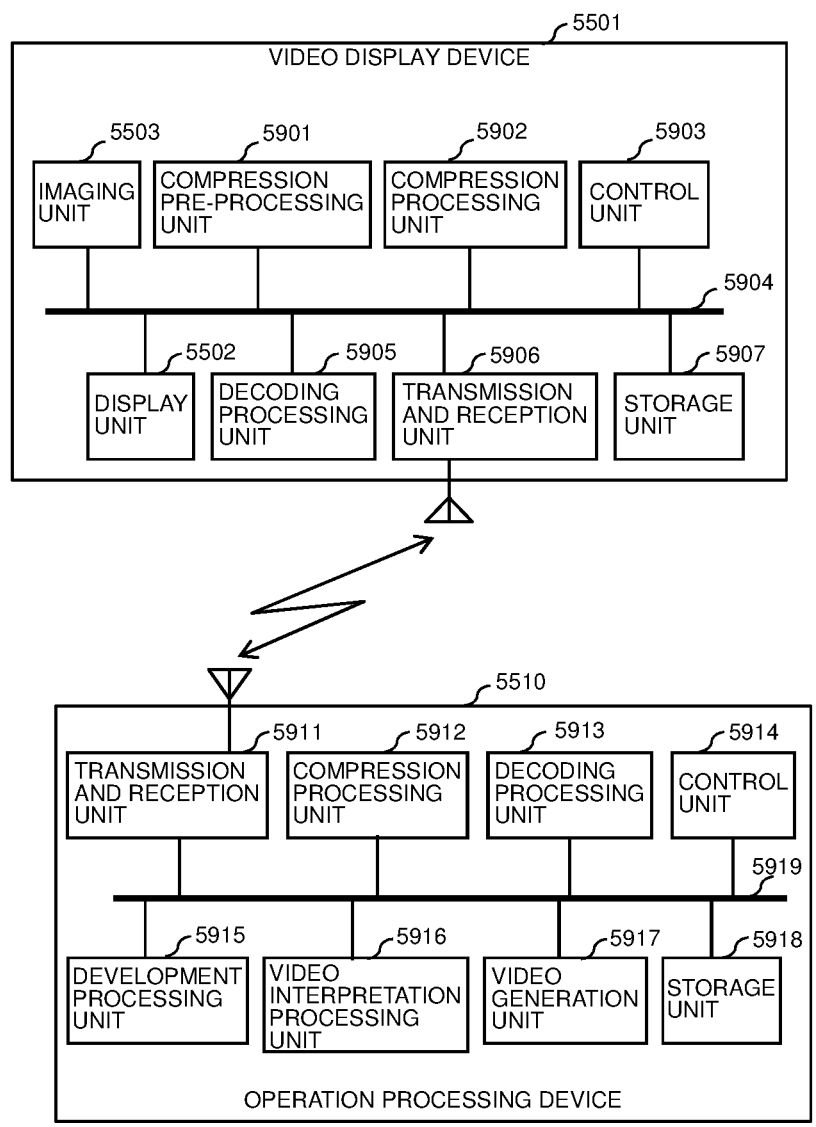
FIG. 52 is a configuration diagram of a video display device and an operation processing device in Example 10.

Functional configurations of the video display device 5501 and the operation processing device 5510 are illustrated in FIG. 52. The same reference numeral will be given of the same configuration as in FIG. 51.

The video display device 5501 includes a bus 5904, and the imaging unit 5503, a compression pre-processing unit 5901, a compression processing unit 5902, a control unit 5903, the display unit 5502, a decoding processing unit 5905, a transmission and reception unit 5906, and a storage unit 5907 which are connected to each other with the bus 5904.

The operation processing device 5510 includes a bus 5919, and a transmission and reception unit 5911, a compression processing unit 5912, a decoding processing unit 5913, a control unit 5914, a development processing unit 5915, a video interpretation processing unit 5916, a video generation unit 5917, and a storage unit 5918 which are connected to each other with the bus 5919.

Examples of the compression pre-processing unit 5901 include the compression pre-processing unit 3001 in FIG. 26, the compression pre-processing unit 3801 in FIG. 33, and the compression pre-processing unit 4602 in FIG. 40.

Examples of the compression processing unit 5902 and the compression processing unit 5912 include the compression processing unit 3005 in FIG. 26, the compression processing unit 3805 in FIG. 33, and the compression processing unit 4606 in FIG. 40.

Examples of the decoding processing unit 5905 and the decoding processing unit 5913 include the decoding processing unit 3010 in FIG. 26.

Examples of the transmission and reception unit 5906 and the transmission and reception unit 5911 include the transmission and reception unit 4902 and the transmission and reception unit 4904 in FIG. 46, and the transmission and reception unit 5906 and the transmission and reception unit 5911 are directly connected to each other for data transmission and reception.

For example, the control unit 5903 collectively controls the imaging unit 5503, the compression pre-processing unit 5901, the compression processing unit 5902, the display unit 5502, the decoding processing unit 5905, and the transmission and reception unit 5906.

Examples of the development processing unit 5915 include the development processing unit 3011 in FIG. 26, and the development processing unit 5011 in FIG. 44.

For example, the control unit 5914 collectively controls the transmission and reception unit 5911, the compression processing unit 5912, the decoding processing unit 5913, the development processing unit 5915, the video interpretation processing unit 5916, and the video generation unit 5917.

The video display device 5501 processes a video captured by the imaging unit 5503 by the compression pre-processing unit 5901, compresses the video by the compression processing unit 5902, and transmits the video to the operation processing device 5510 by the transmission and reception unit 5906. In addition, the transmission and reception unit 5906 decodes the video received from the operation processing device 5510 by the decoding processing unit 5905 as necessary, and displays the video on the display unit 5502.

The operation processing device 5510 decodes the video, which is received from the video display device 5501 by the transmission and reception unit 5911, by the decoding processing unit 5913, and creates a video in which a subject can be seen by the development processing unit 5915. The video interpretation processing unit 5916 interprets the video developed by the development processing unit 5915. With regard to the video to be interpreted, for example, in the case of controlling the video display device 5501 or the operation processing device 5510 with movement of a hand, the movement of the hand is interpreted, and processing capable of being allocated to the movement of the hand is performed. In a case where the movement of the hand is an instruction for the operation processing device 5510, for example, the movement of the hand relates to display such as operation menu display, the operation processing device 5510 generates a video by the video generation unit 5917, and transmits the video from the transmission and reception unit 5911 to the video display device 5501.

In the above-described video display device 5501, a video display device and a video display system, in which a reduction in size and weight is possible due to an imaging unit that does not uses a lens, processing by the video display device is reduced, and the amount of transmission is reduced due to the compression processing, and which is suitable for a head-mounted type, are realized.

Hereinbefore, description has been given of examples, but the invention is not limited to the above-described examples, and includes various modification examples. For example, the examples have been described in detail for easy understanding of the invention, and it is not limited to a case where all of the configurations are included. In addition, a configuration of another example may be added to a configuration of an arbitrary example. In addition, with respect to parts of the respective examples, addition, deletion, and substitution of another configuration may be performed.

| REFERENCE SIGNS LIST | |
|---|---|
| 102 | Modulator |
| 103 | Image sensor unit |
| 104 | Front surface side grating pattern |
| 105 | Rear surface side grating pattern |
| 106 | Image processing unit |
| 107 | Image display unit |
| 2201, 3012 | Storage unit |
| 2203 | Focus setting unit |
| 2902, 4601 | Image division unit |
| 3002 | Sensor signal processing unit |
| 3003 | Difference processing unit |
| 3004 | Data conversion processing unit |

| REFERENCE SIGNS LIST | |
|---|---|
| 3007 | Output processing unit |
| 3008 | Storage device |
| 3009 | Input processing unit |
| 3010 | Decoding processing unit |
| 3011, 5011 | Development processing unit |
| 3013 | Image output unit |
| 3100, 4610, 5100, 5202 | Reproduction device |
| 3101, 3802 | Control unit |
| 3800, 4600, 4901 | Imaging device |
| 3801 | Compression pre-processing unit |
| 3805 | Compression processing unit |
| 3806 | Operation parameter generation unit |
| 4902, 4904 | Transmission and reception unit |
| 4903 | Network |
| 4905 | Image recording and reading unit |
| 4920 | Recording and reproduction device |
| 5201 | Recording device |
| 5501 | Video display device |
| 5510 | Operation processing device |
| 5600 | Imaging and reproduction device |

The invention claimed is:

1. An imaging device that continuously captures images, the imaging device comprising:
an image sensor configured to convert optical images taken by a plurality of light reception elements arranged in an array shape on an imaging surface into image signals, and to output the image signals;
a modulator that is provided on a light reception surface of the image sensor and configured to modulate light intensity; and
a difference processor configured to calculate a difference of the image signals output from the image sensor,
wherein the modulator includes a first grating pattern constituted by a plurality of lines, and a second grating pattern having a phase deviating from a phase of the first grating pattern,
wherein the first grating pattern and the second grating pattern are arranged horizontally so that first image signal output from the image sensor corresponding to the first grating pattern and second image signal output from the image sensor corresponding to the second grating pattern are read from the image sensor at a same timing, and
wherein the difference processor calculates a difference between the first image signal and the second image signal read from the image sensor at the same timing.

2. The imaging device according to claim 1, wherein the difference processor generates a difference data based on the calculated difference of the image signals.

3. The imaging device according to claim 2, further comprising:
a parameter setting unit configured to set a data conversion parameter on a basis of a range of the difference of the image signals and the difference data which are obtained by the difference processor;
a data convertor configured to generate an image data using the difference data obtained by the difference processor and the data conversion parameter obtained by the parameter setting unit; and
a compressor configured to compress the image data generated by the data convertor,
wherein the parameter setting unit set the data conversion parameter at a regular interval from the difference data which is continuously input, and
the compressor includes information indicating the rage of the difference in the compressed image data.

4. The imaging device according to claim 3,
wherein the image data inputted to the compressor is a plurality of images inputted continuously for every constant period,
the compressor is configured to compress the plurality of images as a group image by using a correlation between the plurality of images, and
the regular interval of setting of the data conversion parameter by the parameter setting unit is equal to the constant period for which the compressor generates the group image.

5. The imaging device according to claim 4,
wherein the compressor generates a key image to be compressed regardless of other images among the group image, and
the parameter setting unit generates the data conversion parameter by using the range of the difference and the difference data which are correspond to the key image.

6. The imaging device according to claim 4,
wherein the parameter setting unit generates the data conversion parameter by using the range of the difference and the difference data which are correspond to the group image.

7. An imaging device that continuously captures images, the imaging device comprising:
an image sensor configured to convert optical images taken by a plurality of light reception elements arranged in an array shape on an imaging surface into image signals, and to output the image signals; and
a modulator that is provided on a light reception surface of the image sensor and configured to modulate light intensity,
wherein the modulator includes a first grating pattern constituted by a plurality of lines, a second grating pattern, a third grating pattern and a fourth grating pattern on a same surface, the second grating pattern having a phase deviating from a phase of the first grating pattern by $\pi/2$, the third grating pattern having a phase deviating from the phase of the first grating pattern by $\pi$, and the fourth grating pattern having a phase deviating from the phase of the first grating pattern by $3\pi/2$,
wherein the image signals output from the image sensor include a first image signal corresponding to the first grating pattern, a second image signal corresponding to the second grating pattern, a third image signal corresponding to the third grating pattern and a fourth image signal corresponding to the fourth grating pattern,
wherein the first grating pattern and the third grating pattern are arranged horizontally so that the first image signal and the third image signal are read from the image sensor at a same timing, and
wherein the second grating pattern and the fourth grating pattern are arranged horizontally so that the second image signal and the fourth image signal are read from the image sensor at a same timing.

8. The imaging device according to claim 7, further comprising:
a difference processor configured to calculate a difference of the image signals output from the image sensor,
wherein the difference processor calculates a difference between the first image signal and the third image signal and a difference between the second image signal and the fourth image signal.

* * * * *